United States Patent [19]

Tsurutani et al.

[11] Patent Number: 6,014,267

[45] Date of Patent: Jan. 11, 2000

[54] VARIABLE MAGNIFICATION OPTICAL SYSTEM

[75] Inventors: Katsutoshi Tsurutani; Katsuhiro Takamoto, both of Sakai, Japan

[73] Assignee: Minolta Co., Ltd., Osaka, Japan

[21] Appl. No.: 09/169,771

[22] Filed: Oct. 9, 1998

[30] Foreign Application Priority Data

Oct. 13, 1997 [JP] Japan ................................. 9-279150

[51] Int. Cl.[7] .................................................. G02B 15/14
[52] U.S. Cl. ........................................ 359/689; 359/683
[58] Field of Search .................................. 359/689, 683

[56] References Cited

U.S. PATENT DOCUMENTS

| 5,646,777 | 7/1997 | Ohshita | 359/422 |
| 5,872,660 | 2/1999 | Kohno et al. | 359/689 |
| 5,889,620 | 3/1999 | Furuta | 359/689 |
| 5,909,318 | 6/1999 | Tanaka | 359/689 |

FOREIGN PATENT DOCUMENTS

| 3-20735 | 3/1991 | Japan . |
| 7-13077 | 1/1995 | Japan . |

Primary Examiner—Georgia Epps
Assistant Examiner—Timothy J Thompson
Attorney, Agent, or Firm—Sidley & Austin

[57] ABSTRACT

A variable magnification optical system includes, from the projection side, a negative first lens unit, a positive second lens unit and a positive third lens unit. The magnification is varied by moving the first and second lens units along the optical axis. A lens element in the first lens unit and a lens element in the third lens unit are aspherical lens elements of which aspherical deviation is defined. A positive lens element in the third lens unit is made of a material of which anomalous partial dispersibility and Abbe number are defined.

12 Claims, 21 Drawing Sheets

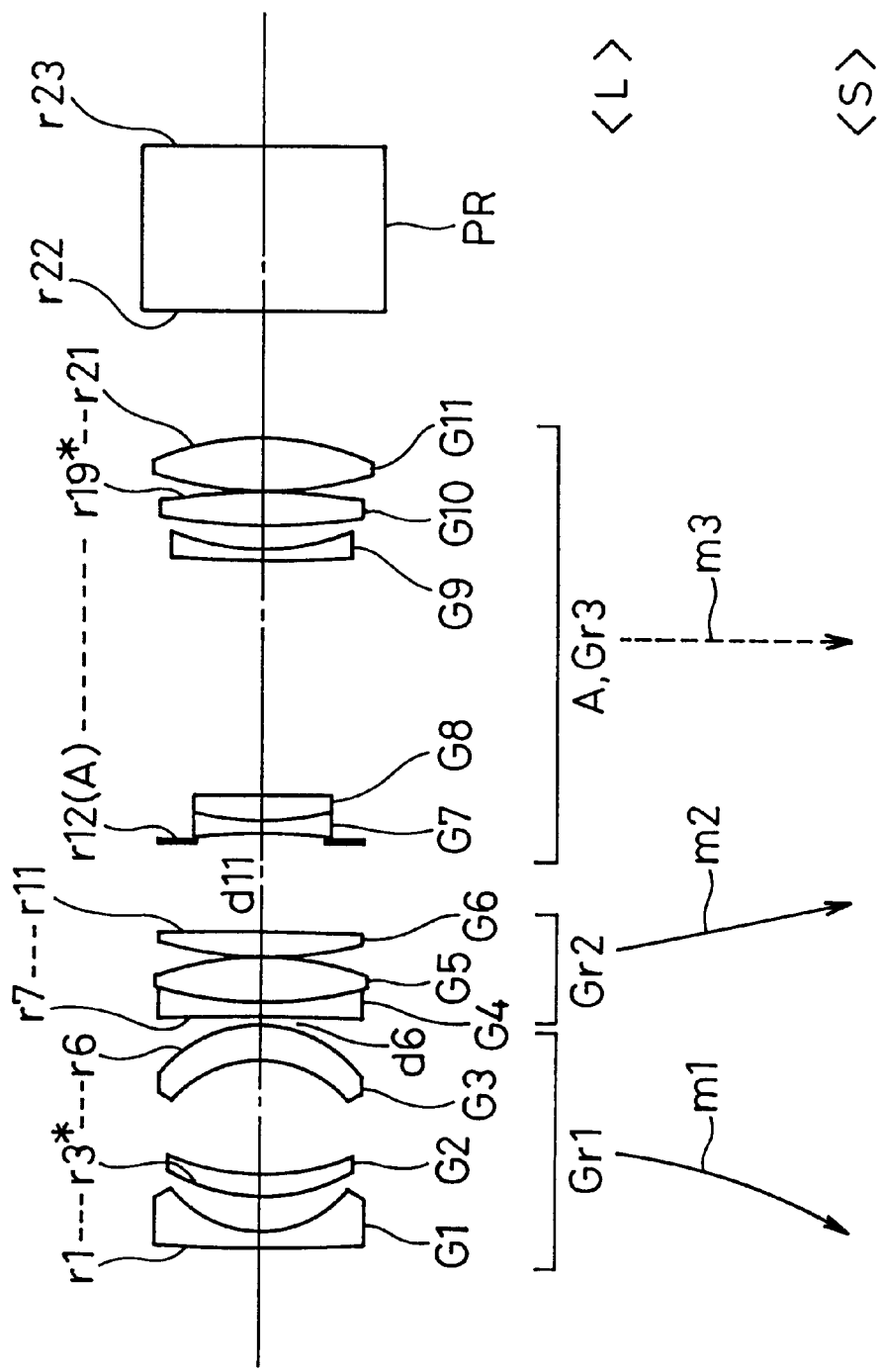

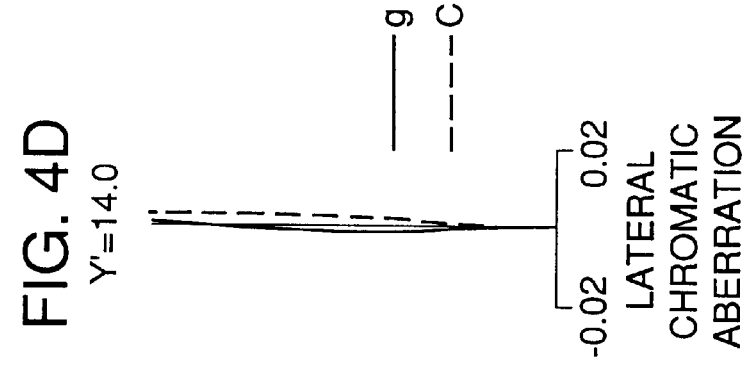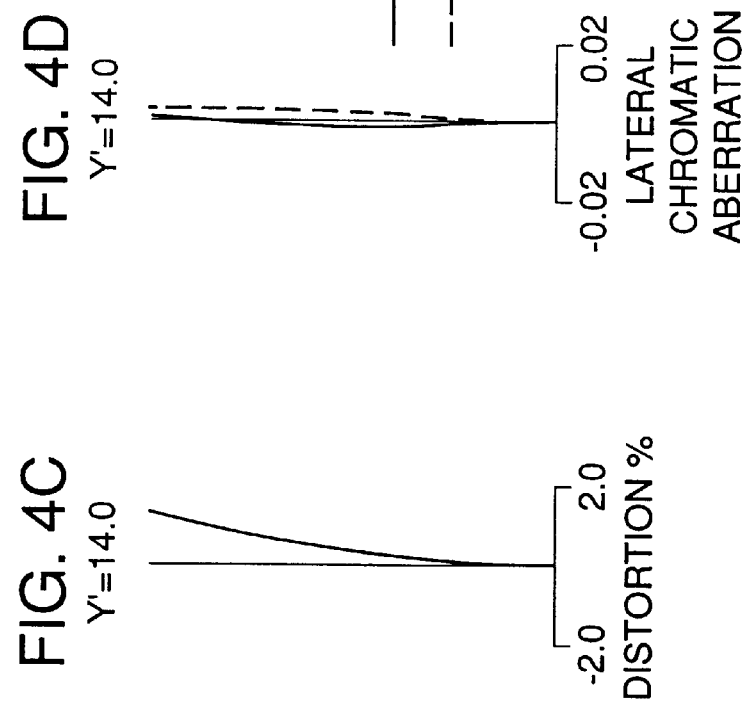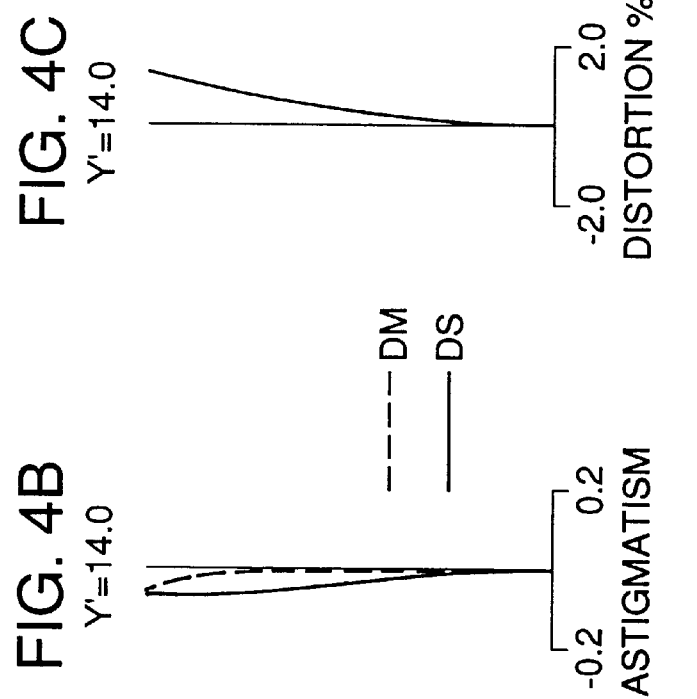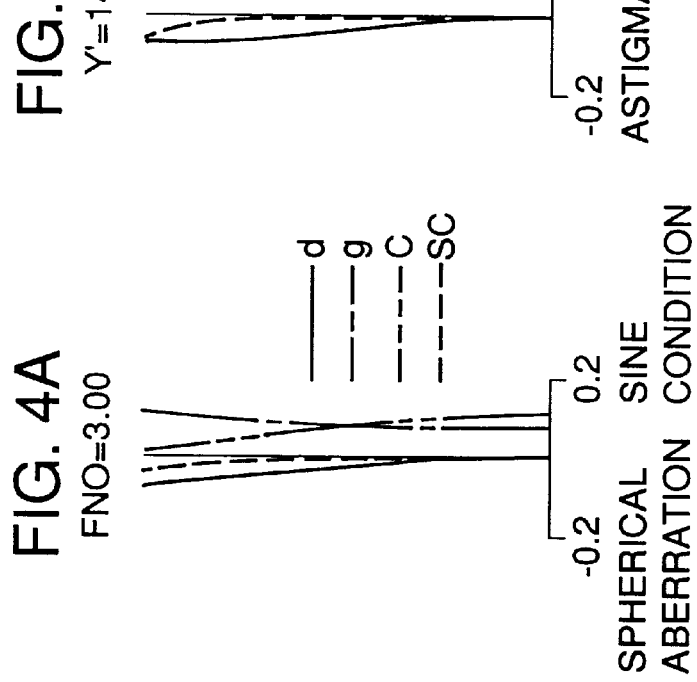

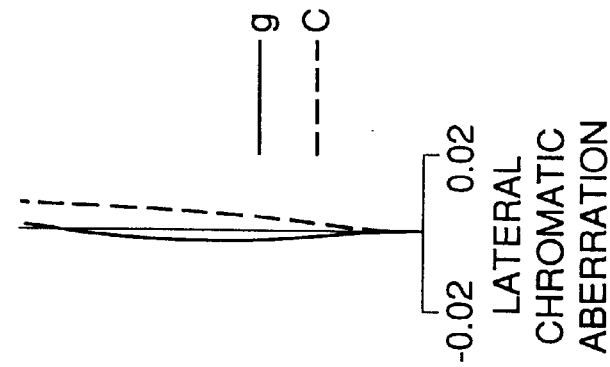
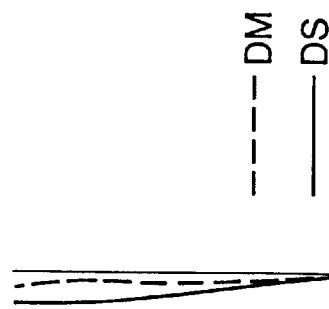
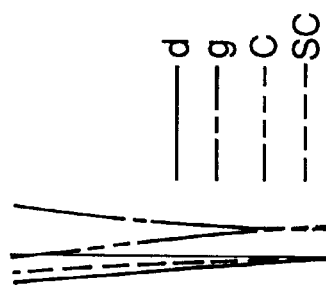

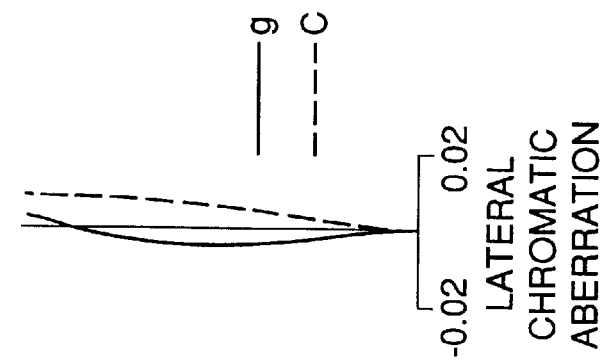
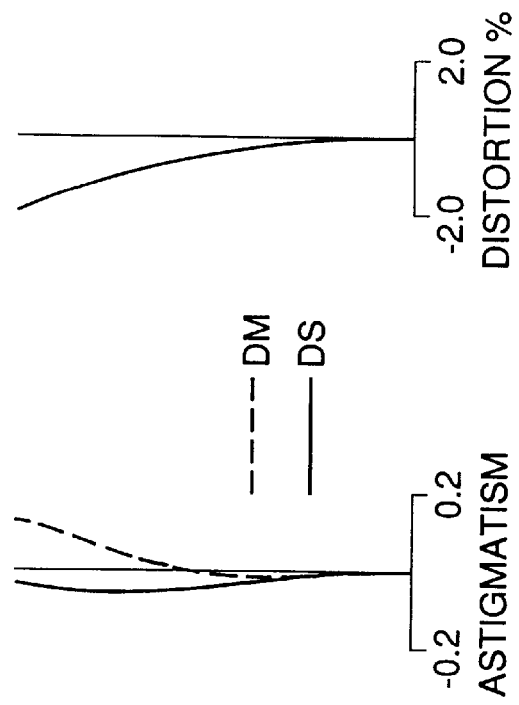
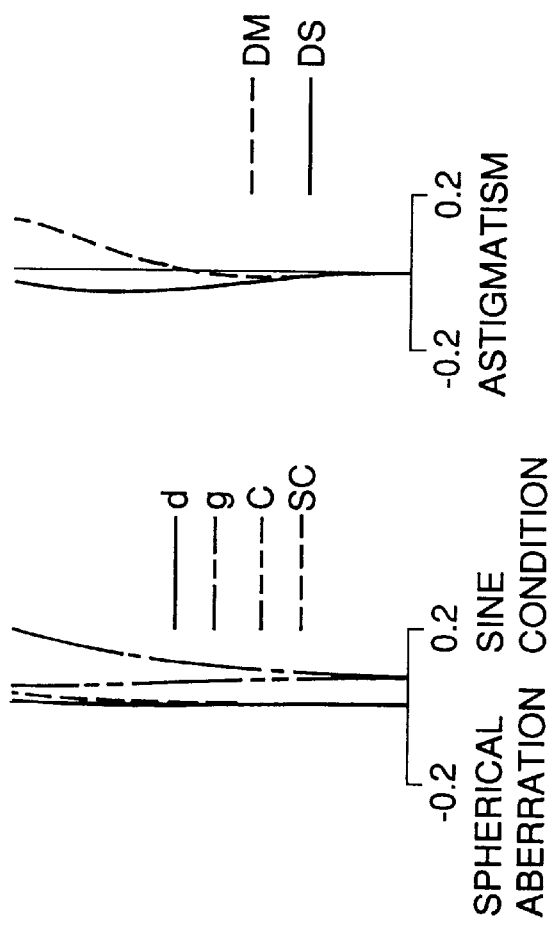

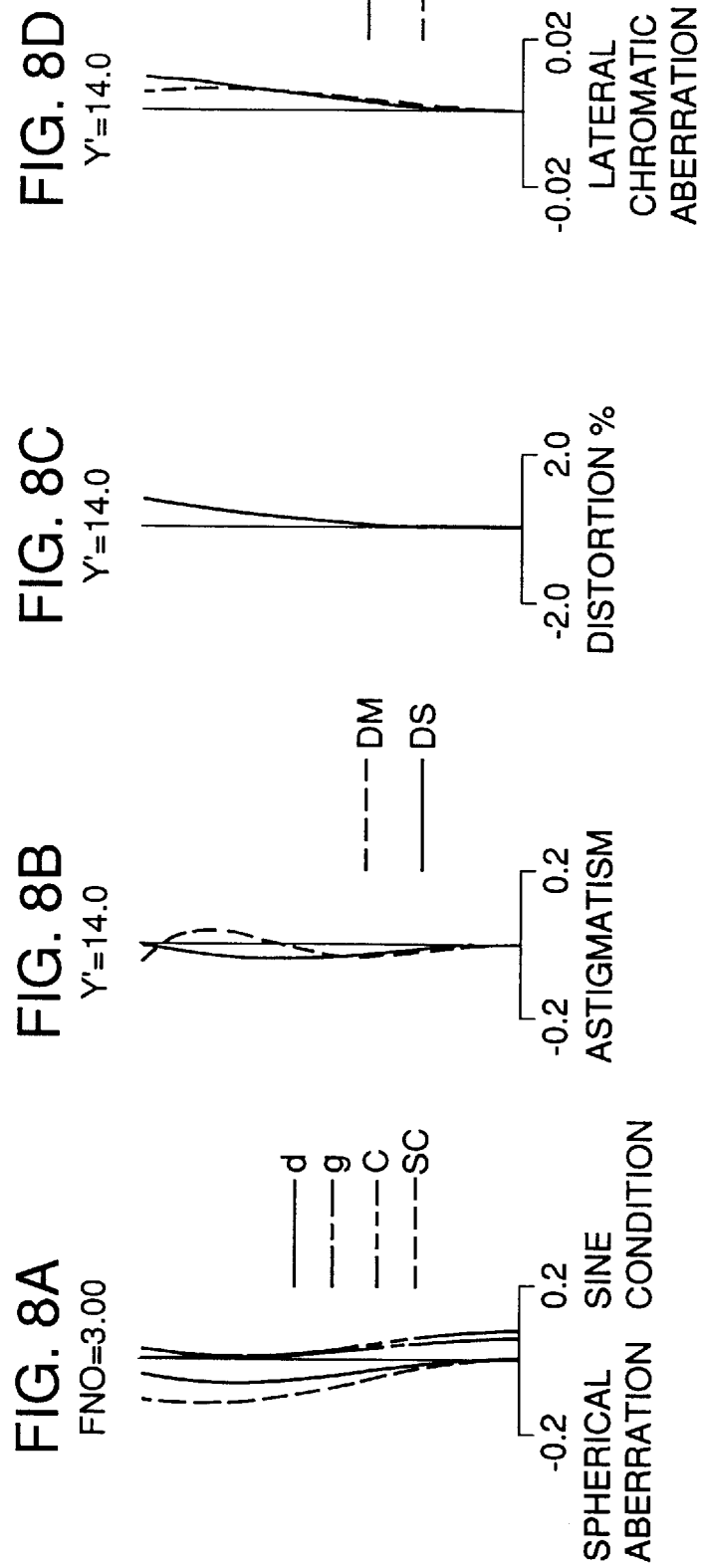

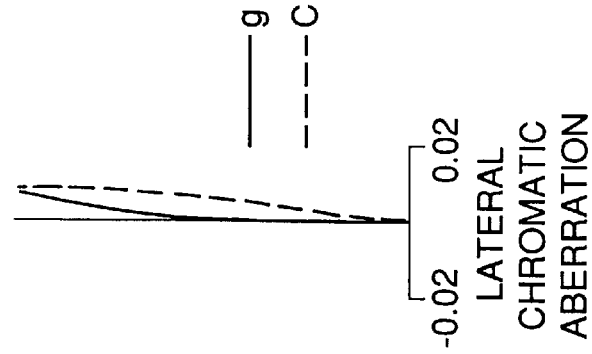
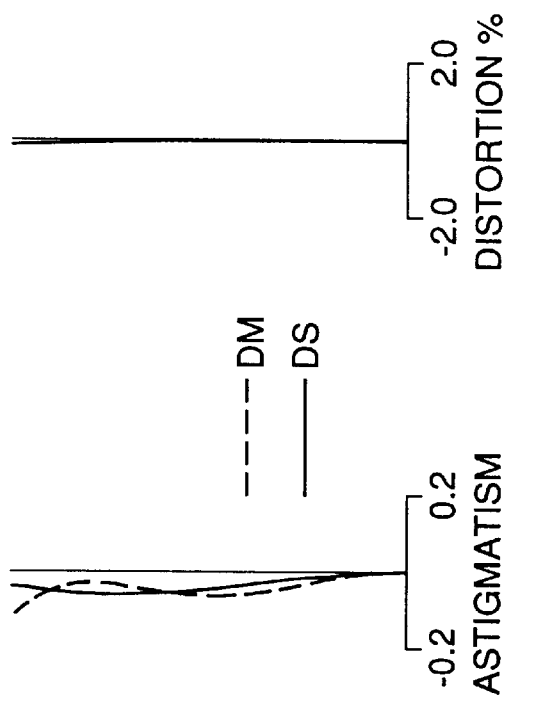
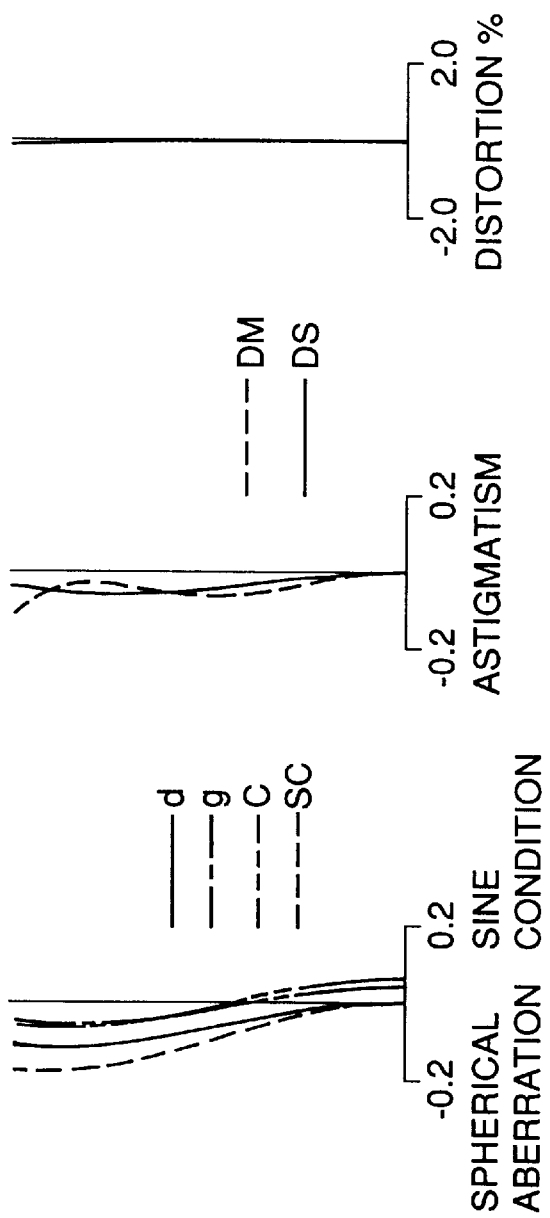

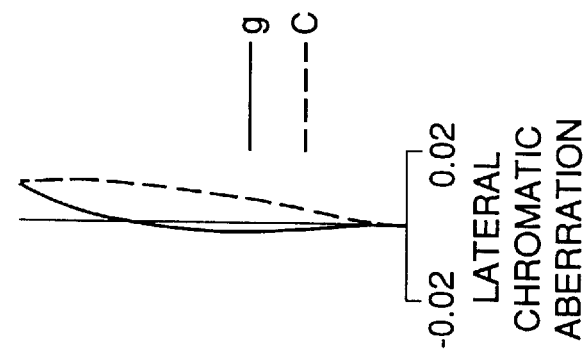
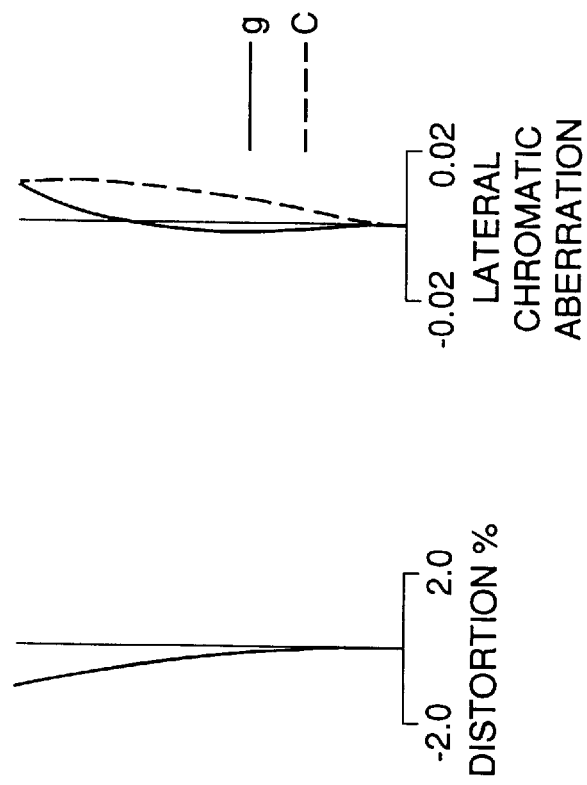
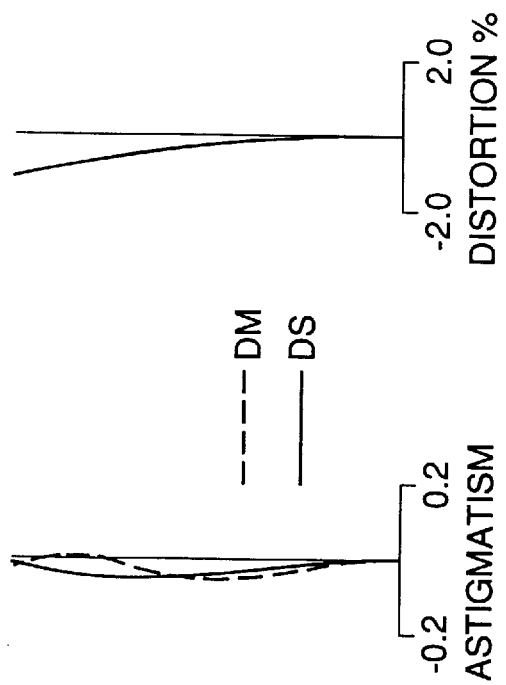
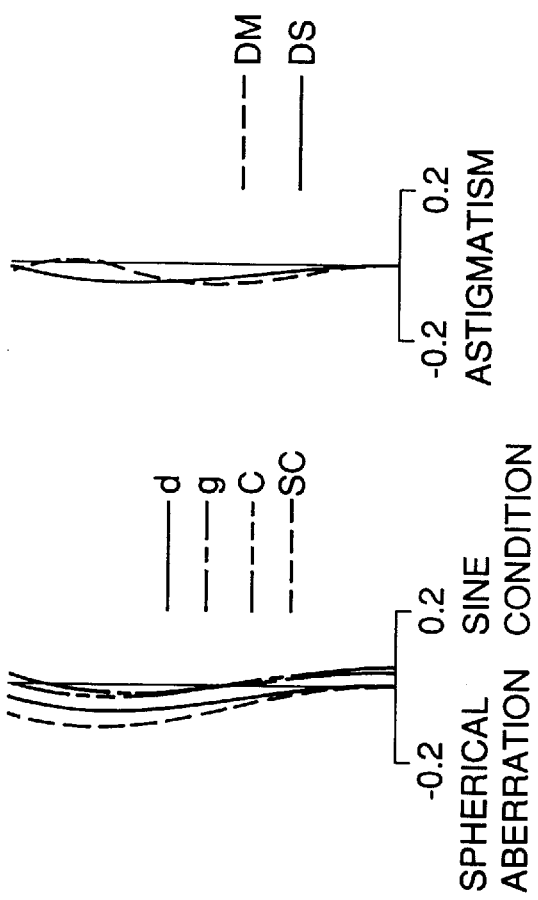

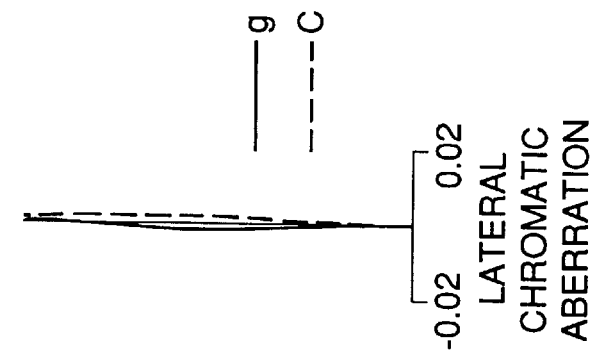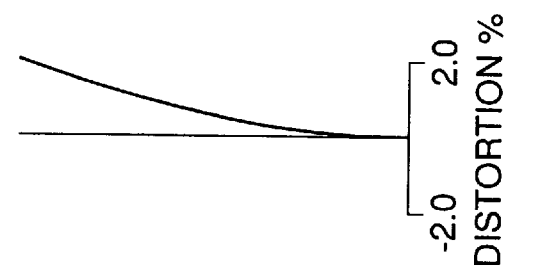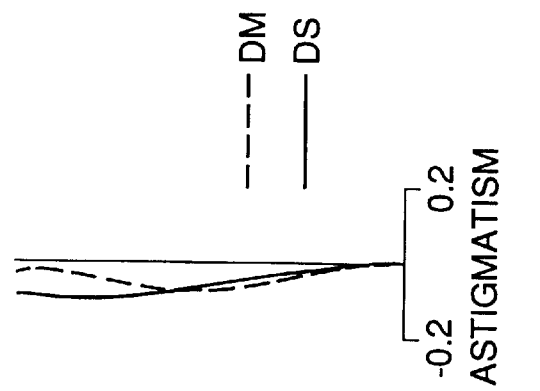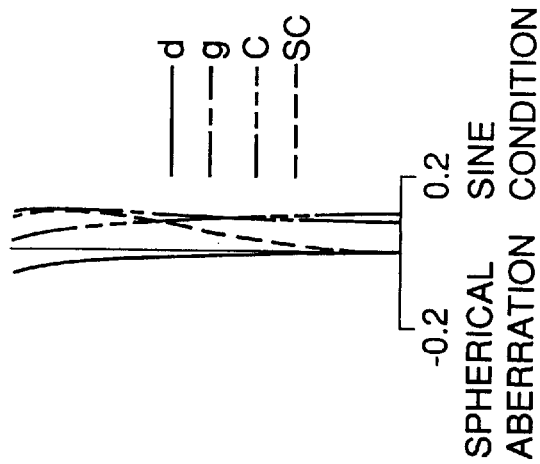

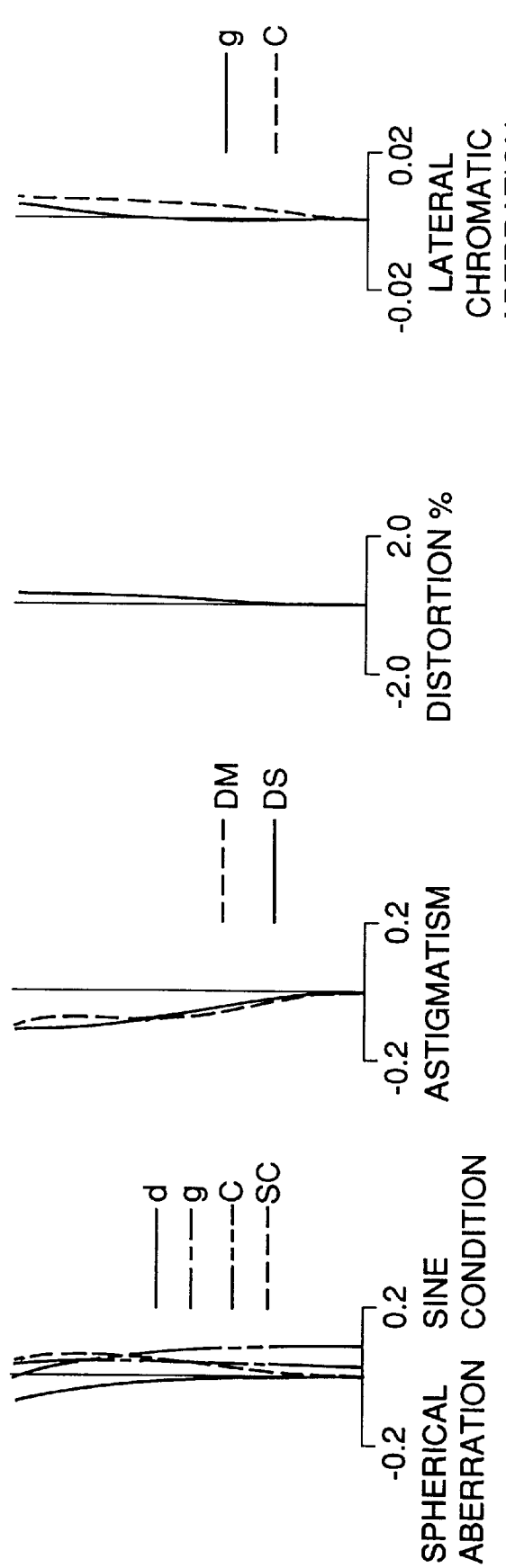

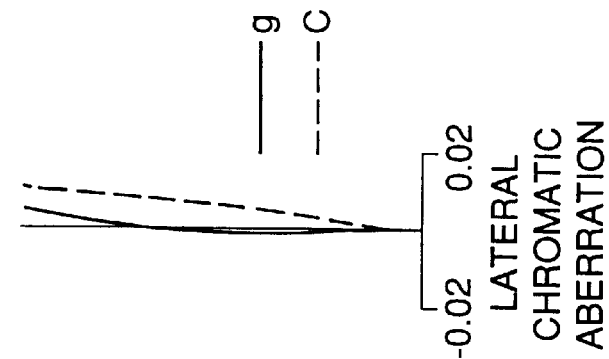
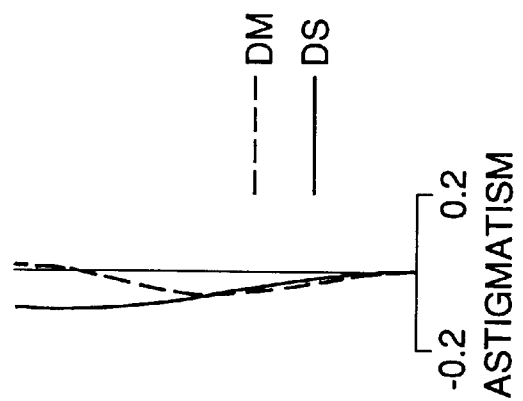
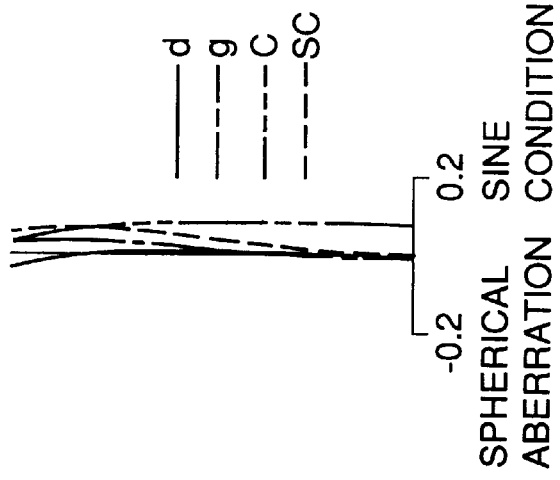

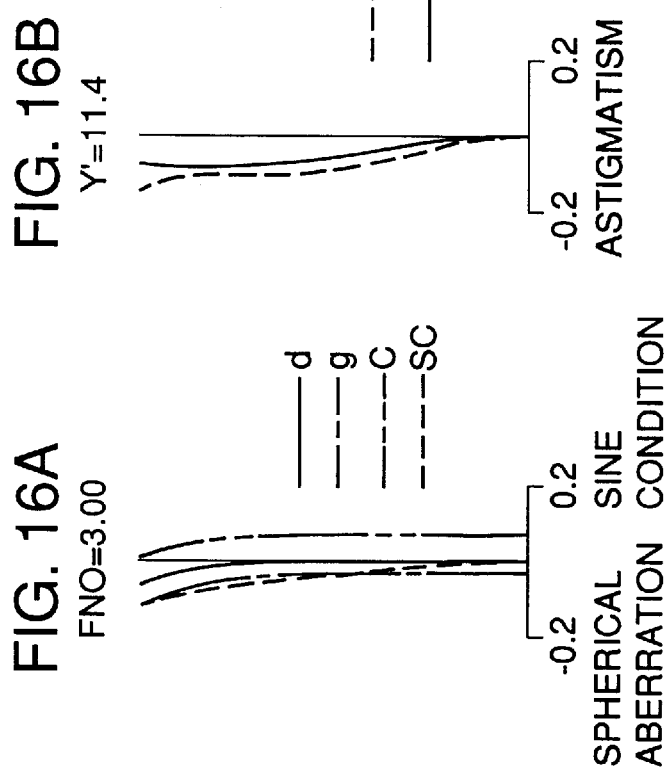

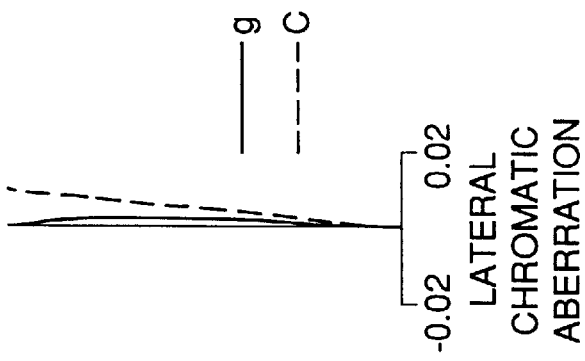
FIG. 17A
FNO=3.00
FIG. 17B
Y'=11.4
FIG. 17C
Y'=11.4
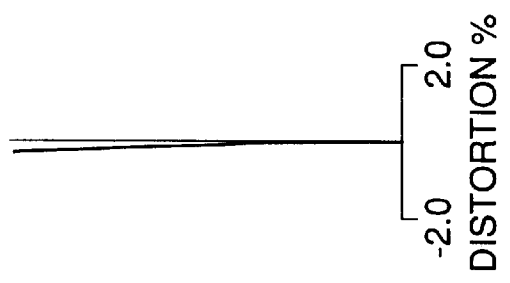
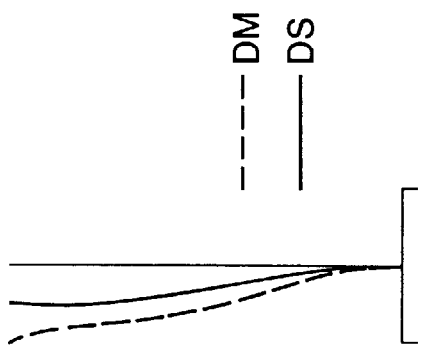
FIG. 17D
Y'=11.4
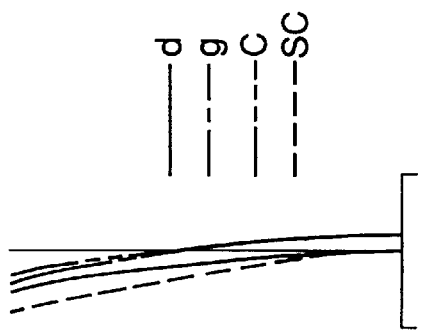

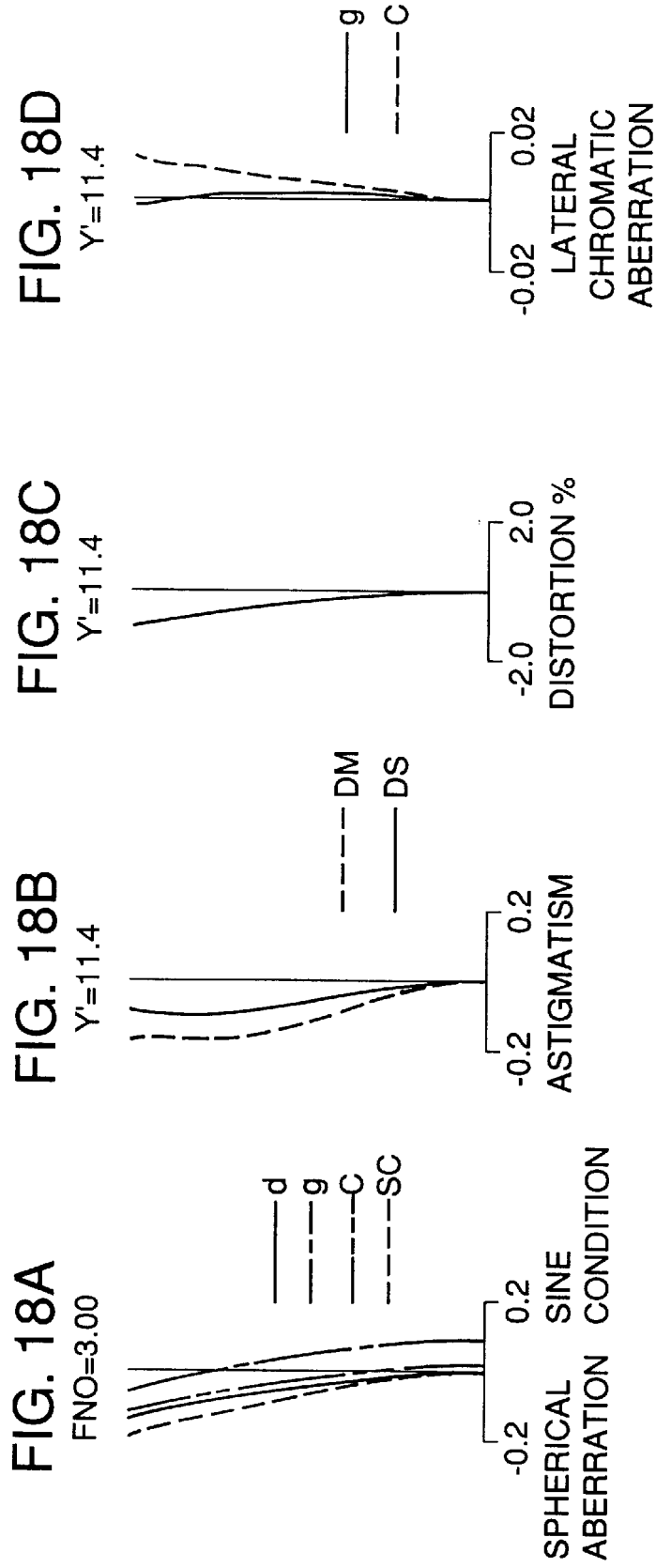

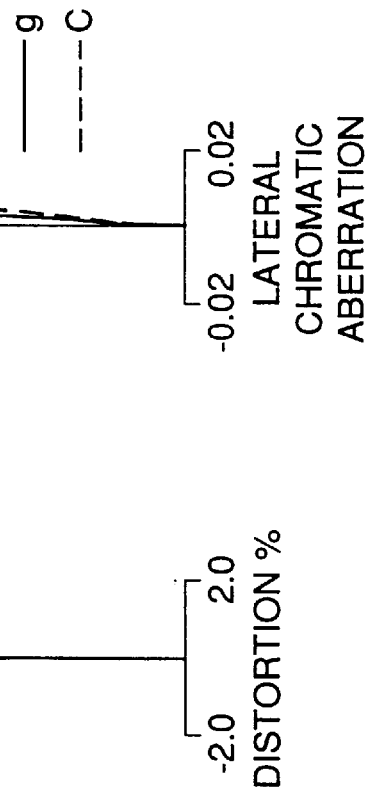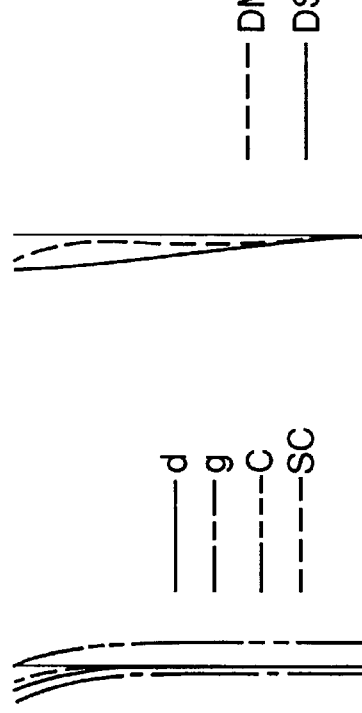

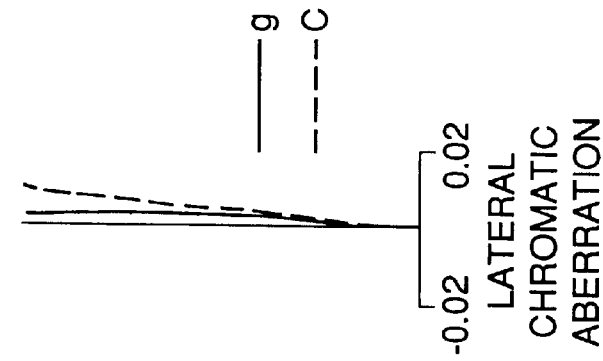
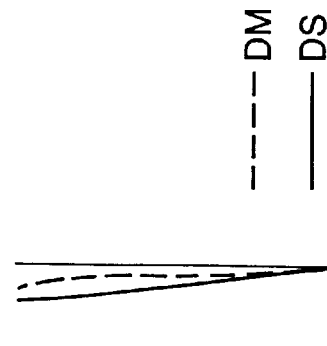
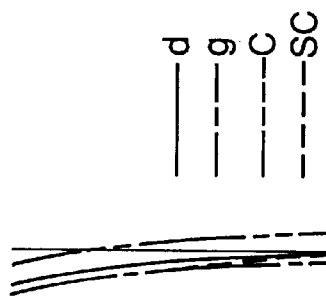

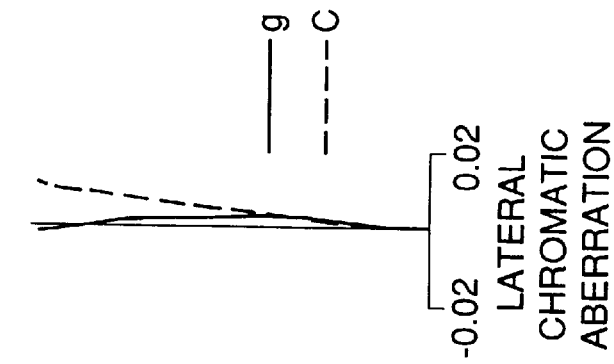
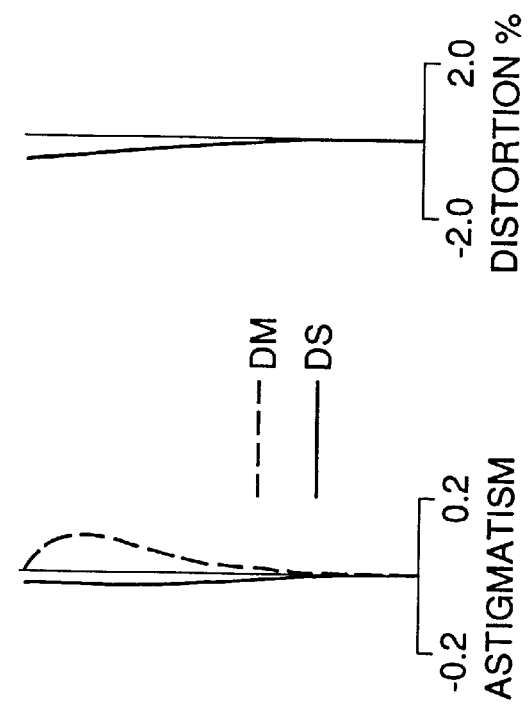
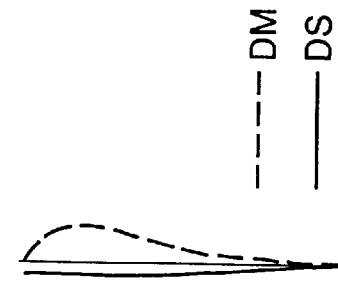
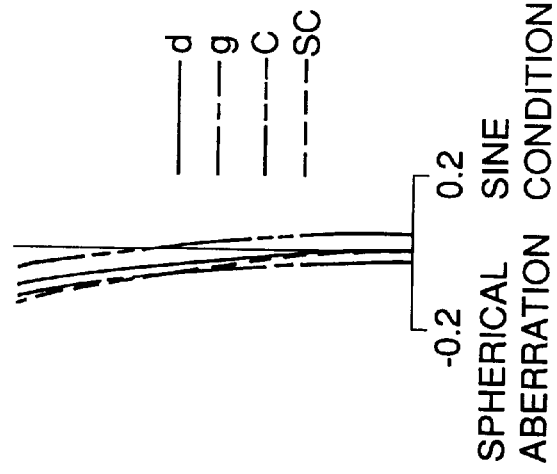

VARIABLE MAGNIFICATION OPTICAL SYSTEM

This application is based on application No. H9-279150 filed in Japan, the content of which is hereby incorporated by reference.

1. Field of the Invention

The present invention relates to a variable magnification optical system, for example, to a variable magnification optical system suitable for use as a projection optical system for a projector (e.g. a liquid crystal projector for projecting images of a display device such as a liquid crystal panel onto a screen).

2. Background of the Invention

In recent years, with the spread of personal computers, liquid crystal projectors have been widely used as presentation apparatuses in the field of business. Moreover, it is expected that there will be demands for liquid crystal projectors as home projectors used for home theater systems. In response to such demands, single-plate or three-plate liquid crystal front projectors of approximately 100,000 to 300,000 pixels have been provided.

A variable magnification projection optical system used for such a liquid crystal projector is proposed in Japanese Laid-open Patent Application No. H7-13077. This is a variable magnification optical system comprising three lens units of negative, positive, positive configuration, and has performance suitable for projecting images of conventional display devices. However, since lateral chromatic aberration is not sufficiently curbed, it is difficult to project images of display devices of higher image quality.

As a variable magnification optical system in which lateral chromatic aberration is curved, a variable magnification optical system for photographing comprising three lens units of negative, positive, positive configuration is proposed in Japanese Published Patent Application No. H3-20735. In this variable magnification optical system, variation in lateral chromatic aberration due to magnification variation is curbed by using anomalous dispersion glass for a positive lens element in the third lens unit. However, in this optical system, correction of lateral chromatic aberration is insufficient to project images of display devices of high image quality.

Presently, projectors are required which have higher image quality than was previously required. For example, for projectors for mini theaters, resolution of 1024×768 dots (XGA) to 1280×1024 dots (SXGA) or higher is required. For home projectors, horizontal resolution of 400 TV lines or higher is required with the spread of high-definition television broadcasts such as Japanese Hi-Vision system. To satisfy such demands for higher image quality, the number of pixels of display devices such as liquid crystal displays has been increased and the adoption of a three-plate projection method using a dichroic prism has been started. In addition thereto, the size of display devices using liquid crystal have been reduced for size reduction of projectors.

To project images of a display device having a reduced size and an increased number of pixels, a variable magnification projection optical system having higher performance than conventional optical systems is required. However, as mentioned previously, with the arrangements of the conventional variable magnification projection optical systems, the necessary optical performance (particularly, lateral chromatic aberration) cannot be sufficiently fulfilled. If the number of lens elements or the lens diameter is increased in order to achieve a high-performance optical system, the overall size of the optical system will naturally increase. If the overall size of the optical system increases, it will be difficult to reduce the size of the projector and the price will inevitably increase.

SUMMARY OF THE INVENTION

An object of the present invention is to provide a variable magnification optical system for projecting images of a display device having a reduced size and an increased number of pixels, the variable magnification optical system having a small amount of lateral chromatic aberration and being low in price.

To achieve the above object, according to one aspect of the present invention, a variable magnification optical system is provided with, from a projection side, a first lens unit having a negative optical power and including at least one lens element having an aspherical surface, a second lens unit having a positive optical power; and a third lens unit having a positive optical power, including at least one lens element having an aspherical surface and including a positive lens element. The first lens unit and second lens unit move along an optical axis direction during zooming operation.

Additionally, this variable magnification optical system fulfills the conditions below:

$$0 < \Delta X1/fW < 0.08$$

$$-0.04 < \Delta X3/fW < 0$$

$$0.015 < \Theta 3 - (0.644 - 0.00168 \cdot vd3) < 0.06$$

$$65 < vvd3 < 100$$

where $\Delta X1$ represents an aspherical deviation of the lens element having an aspherical surface in the first lens unit;

$\Delta X3$ represents an aspherical deviation of the lens element having an aspherical surface in the third lens unit;

fW represents a focal length of the entire optical system in the shortest focal length condition;

$\Theta 3 = (n3g - nF3)/(nF3 - nC3)$ $vd3 = (nd3 - 1)/(nF3 - nC3)$ ng3 represents a refractive index of the positive lens element in the third lens unit for g-line (435.84 nm);

nF3 represents a refractive index of the positive lens element in the third lens unit for F-line (486.13 nm);

nd3 represents a refractive index of the positive lens element in the third lens unit for d-line (587.56 nm); and nC3 represents a refractive index of the positive lens element in the third lens unit for C-line (656.28 nm).

BRIEF DESCRIPTION OF THE DRAWINGS

This and other objects and features of this invention will become clear from the following description, taken in conjunction with the preferred embodiments with reference to the accompanied drawings in which:

FIG. 3 shows the lens arrangement of a first embodiment;

FIGS. 4A to 4D are graphic representations of aberrations of the first embodiment in the longest focal length condition <L>;

FIGS. 5A to 5D are graphic representations of aberrations of the first embodiment in the middle focal length condition <M>;

FIGS. 6A to 6D are graphic representations of aberrations of the first embodiment in the shortest focal length condition <S>;

FIGS. 8A to 8D are graphic representations of aberrations of the second embodiment in the longest focal length condition <L>;

FIGS. 9A to 9D are graphic representations of aberrations of the second embodiment in the middle focal length condition <M>;

FIGS. 10A to 10D are graphic representations of aberrations of the second embodiment in the shortest focal length condition <S>;

FIGS. 12A to 12D are graphic representations of aberrations of the third embodiment in the longest focal length condition <L>;

FIGS. 13A to 13D are graphic representations of aberrations of the third embodiment in the middle focal length condition <M>;

FIGS. 14A to 14D are graphic representations of aberrations of the third embodiment in the shortest focal length condition <S>;

FIGS. 16A to 16D are graphic representations of aberrations of the fourth embodiment in the longest focal length condition <L>;

FIGS. 17A to 17D are graphic representations of aberrations of the fourth embodiment in the middle focal length condition <M>;

FIGS. 18A to 18D are graphic representations of aberrations of the fourth embodiment in the shortest focal length condition <S>;

FIGS. 20A to 20D are graphic representations of aberrations of the fifth embodiment in the longest focal length condition <L>;

FIGS. 21A to 21D are graphic representations of aberrations of the fifth embodiment in the middle focal length condition <M>; and FIGS. 22A to 22D are graphic representations of aberrations of the fifth embodiment in the shortest focal length condition <S>.

DESCRIPTION OF THE PREFERRED EMBODIMENTS

Figure 1:
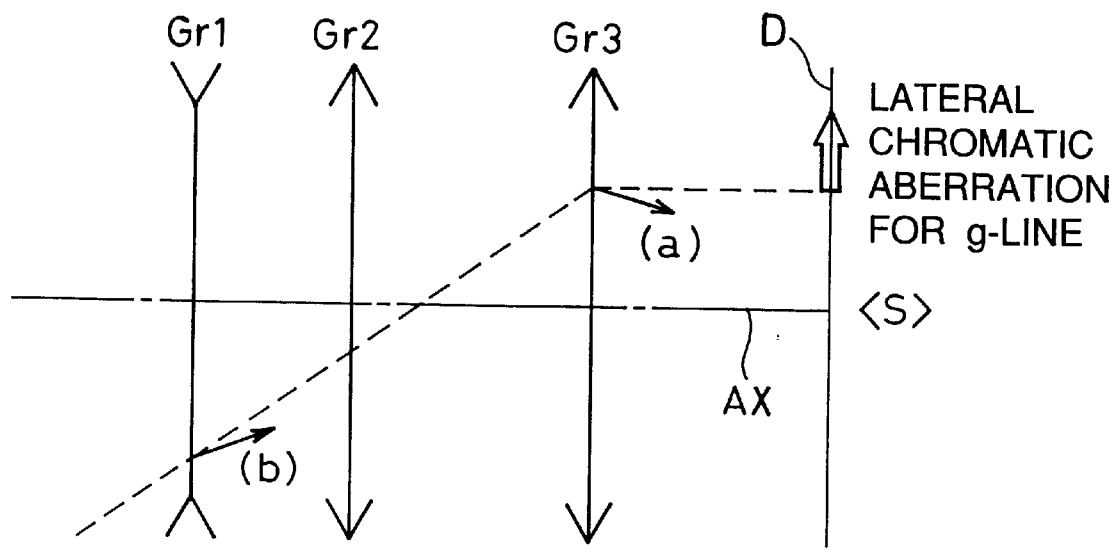
FIG. 1 is a schematic view of assistance in explaining the lateral chromatic aberration correction principle in a variable magnification optical system of negative, positive, positive, configuration.

Hereinafter, a variable magnification optical system embodying the present invention will be described with reference to the drawings. While the embodiments described below are variable magnification optical systems suitable for use as projection optical systems for projectors (e.g. liquid crystal projectors), it is to be understood that they are also suitable for use as imaging optical systems for imaging apparatuses (e.g. video cameras).

FIGS. 3, 7, 11, 15 and 19 show the lens arrangements of first to fifth embodiments in the longest focal length condition <L>. In these figures, the arrows mj (j=1, 2, 3) schematically show the movements of the j-th lens units (Grj) during zooming operation from the longest focal length condition (telephoto condition) <L> to the shortest focal length condition (wide-angle condition) <S>. The surfaces marked with ri (i=1, 2, 3, . . . ) are the i-th surfaces counted from the enlargement side (i.e. the projection side). The surfaces marked with ri followed by asterisks are aspherical. Of the i-th axial distances di (i=1, 2, 3, . . . ) counted from the enlargement side, the axial distances marked with di are variable distances varying during zooming operation.

The first to fifth embodiments are three-unit zoom lens systems comprising, from the enlargement side (projection side), a first lens unit Gr1 having a negative optical power, a second lens unit Gr2 having a positive optical power and a third lens unit Gr3 having a positive optical power. Zooming is performed by moving at least the first lens unit Gr1 and the second lens unit Gr2 along the optical axis. In any of these embodiments, a cross-dichroic prism (PR) is disposed on the reduction side of the third lens unit Gr3, and a diaphragm (A) moving together with the third lens unit Gr3 during zooming operation is disposed between the second lens unit Gr2 and the third lens unit Gr3.

In the first and second embodiments, the lens units comprise the following elements from the enlargement side: The first lens unit Gr1 comprises a meniscus lens element G1 concave to the reduction side, a meniscus lens element G2 convex to the enlargement side, and a meniscus lens element G3 concave to the enlargement side. The second lens unit Gr2 comprises a doublet lens element consisting of a bi-concave lens element G4 and a bi-convex lens element G5, and a bi-convex lens element G6. The third lens unit Gr3 comprises a doublet lens element consisting of a bi-concave lens element G7 and a meniscus lens element G8 convex to the enlargement side, a meniscus lens element G9 concave to the reduction side, and two bi-convex lens elements G10 and G11.

In the third embodiment, the lens units comprise the following elements from the enlargement side: The first lens unit Gr1 comprises a meniscus lens element G1 concave to the reduction side, a meniscus lens element G2 convex to the enlargement side, and a meniscus lens element G3 concave to the enlargement side. The second lens unit Gr2 comprises a doublet lens element consisting of a bi-concave lens element G4 and a bi-convex lens element G5, and a bi-convex lens element G6. The third lens unit Gr3 comprises a doublet lens element consisting of a bi-concave lens element G7 and a bi-convex lens element G8, a meniscus lens element G9 concave to the reduction side, and two bi-convex lens elements G10 and G11.

In the fourth embodiment, the lens units comprise the following elements from the enlargement side: The first lens unit Gr1 comprises a bi-concave lens element G1, a meniscus lens element G2 concave to the reduction side, and a bi-convex lens element G3. The second lens unit Gr2 comprises a doublet lens element consisting of a bi-concave lens element G4 and a bi-convex lens element G5, and a bi-convex lens element G6. The third lens unit Gr3 comprises a doublet lens element consisting of a bi-concave lens element G7 and a bi-convex lens element G8, a bi-concave lens element G9, and two bi-convex lens elements G10 and G11.

In the fifth embodiment, the lens units comprise the following elements from the enlargement side: The first lens unit Gr1 comprises a bi-concave lens element G1, a meniscus lens element G2 concave to the reduction side, and a bi-convex lens element G3. The second lens unit Gr2 comprises a doublet lens element consisting of a meniscus lens element G4 concave to the reduction side and a bi-convex lens element G5, and a meniscus lens element G6 convex to the enlargement side. The third lens unit Gr3 comprises a doublet lens element consisting of a bi-concave lens element G7 and a bi-convex lens element G8, a bi-concave lens element G9, and two bi-convex lens elements G10 and G11.

In a variable magnification optical system comprising three lens units of negative, positive, positive configuration from the projection side wherein the magnification is varied by moving at least the first lens unit Gr1 and the second lens unit Gr2 along the optical axis like in the above-described embodiments, at least one lens element in the first lens unit Gr1 is desirably an aspherical lens element fulfilling the following condition (1) and at least one lens element in the third lens unit Gr3 is desirably an aspherical lens element fulfilling the following condition (2):

$$0 < \Delta X1/fW < 0.08 \quad (1)$$

$$-0.04 < \Delta X3/fW < 0 \quad (2)$$

where $\Delta X1$ represents the aspherical deviation of the aspherical lens element in the first lens unit Gr1;

$\Delta X3$ represents the aspherical deviation of the aspherical lens element in the third lens unit Gr3; and fW represents the focal length of the entire optical system in the shortest focal length condition <S>.

When large distortion is generated in a variable magnification projection optical system, the images projected onto the screen are naturally deteriorated. By providing at least one lens element, in the first lens unit Gr1, in which a peripheral rays passes a high position thereof, with an aspherical surface adding a convergent optical power, negative distortion, particularly, negative distortion caused in the shortest focal length condition <S> can be corrected. By providing at least one lens element in the third lens unit Gr3 with an aspherical surface adding a divergent optical power, spherical aberration and field curvature can be excellently corrected in the entire magnification variation range, so that a high-resolution, high-performance variable magnification optical system can be achieved that can handle a greater number of pixels.

Figure 2:
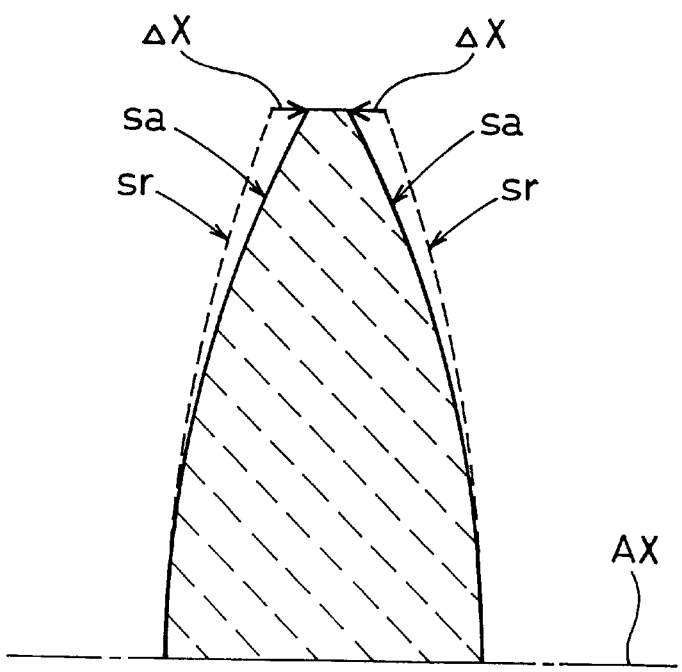
FIG. 2 is a lens cross-sectional view of assistance in explaining the aspherical deviation of an aspherical lens.
Figure 7:
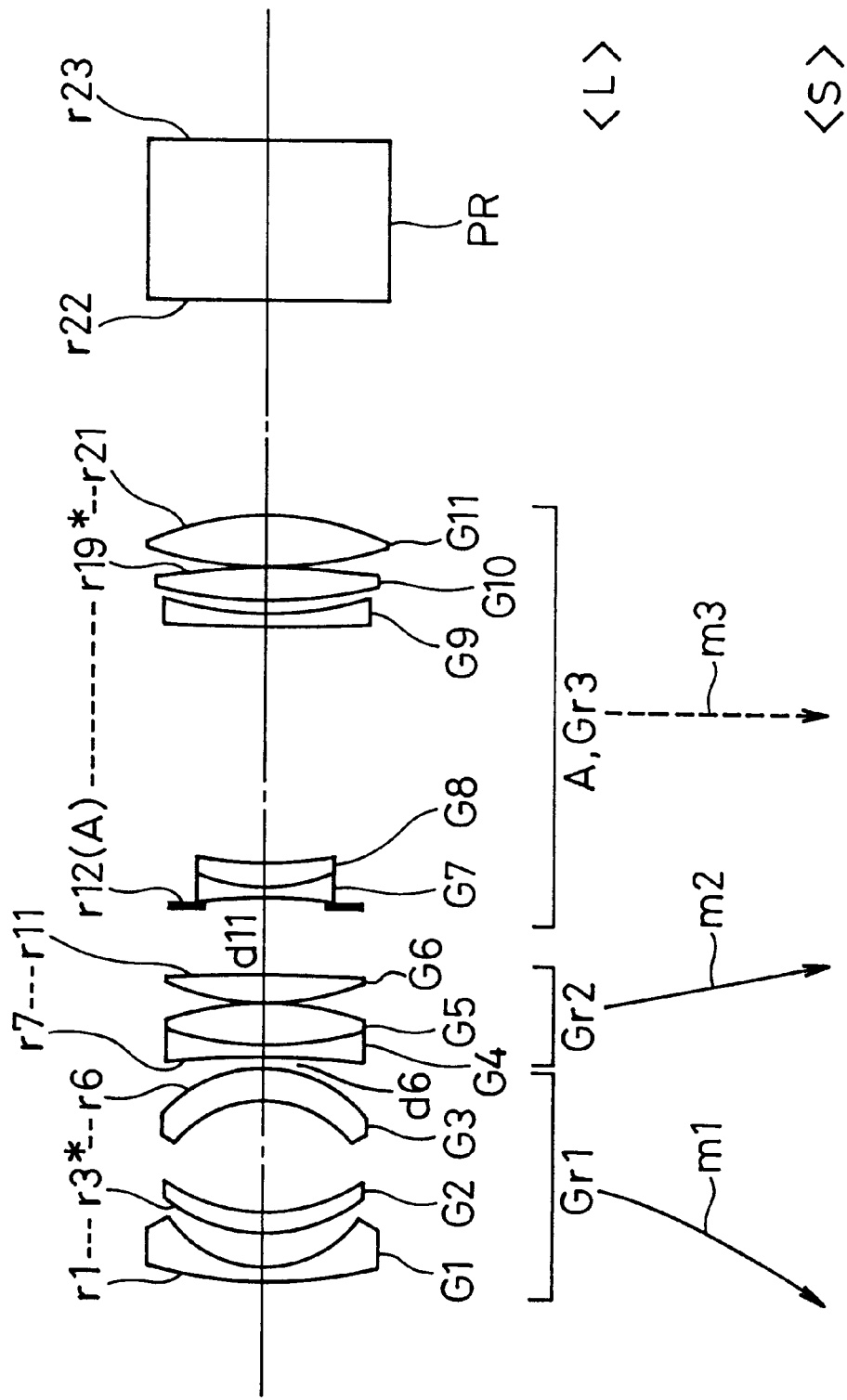
FIG. 7 shows the lens arrangement of a second embodiment.
Figure 11:
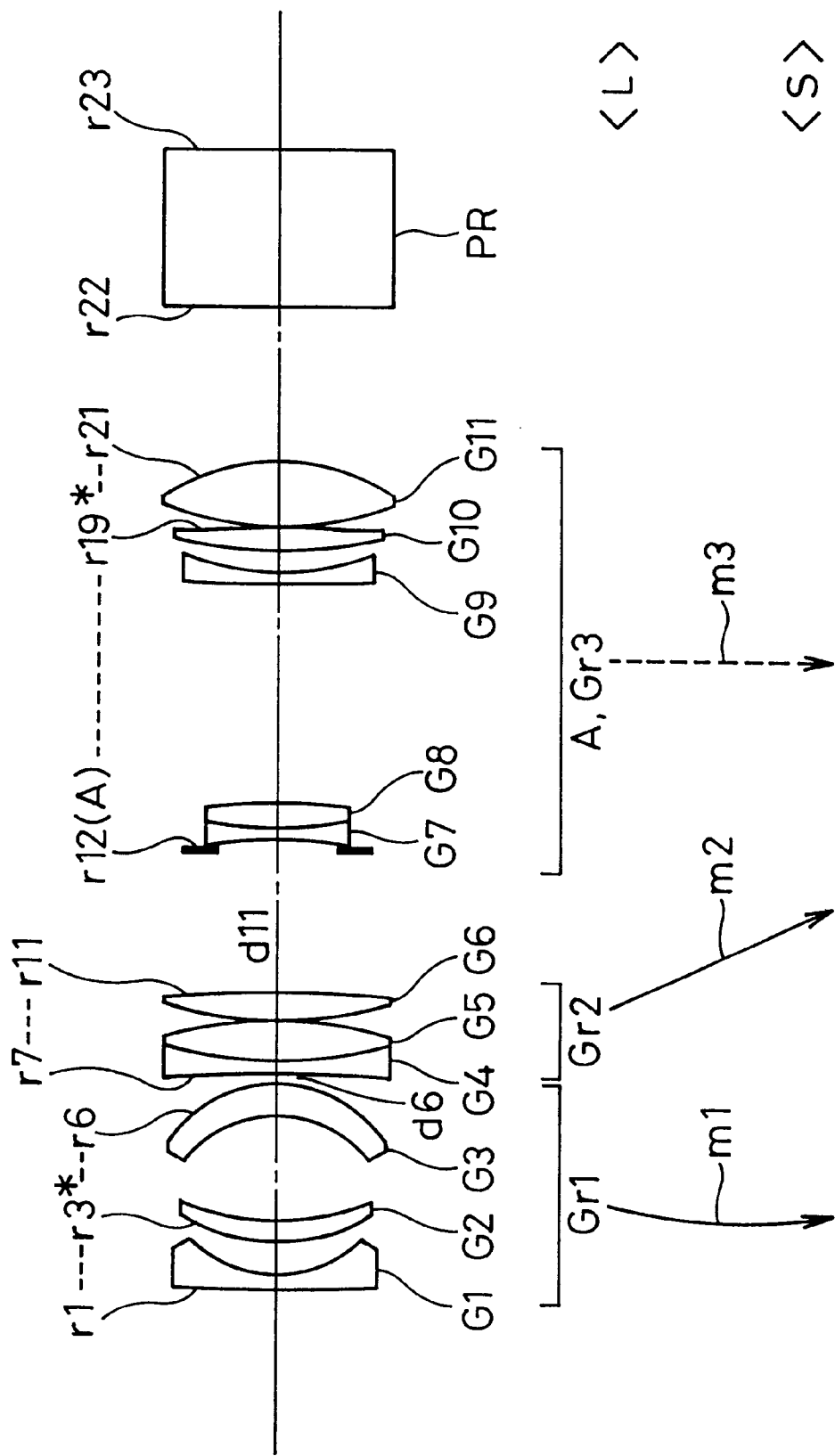
FIG. 11 shows the lens arrangement of a third embodiment.
Figure 15:
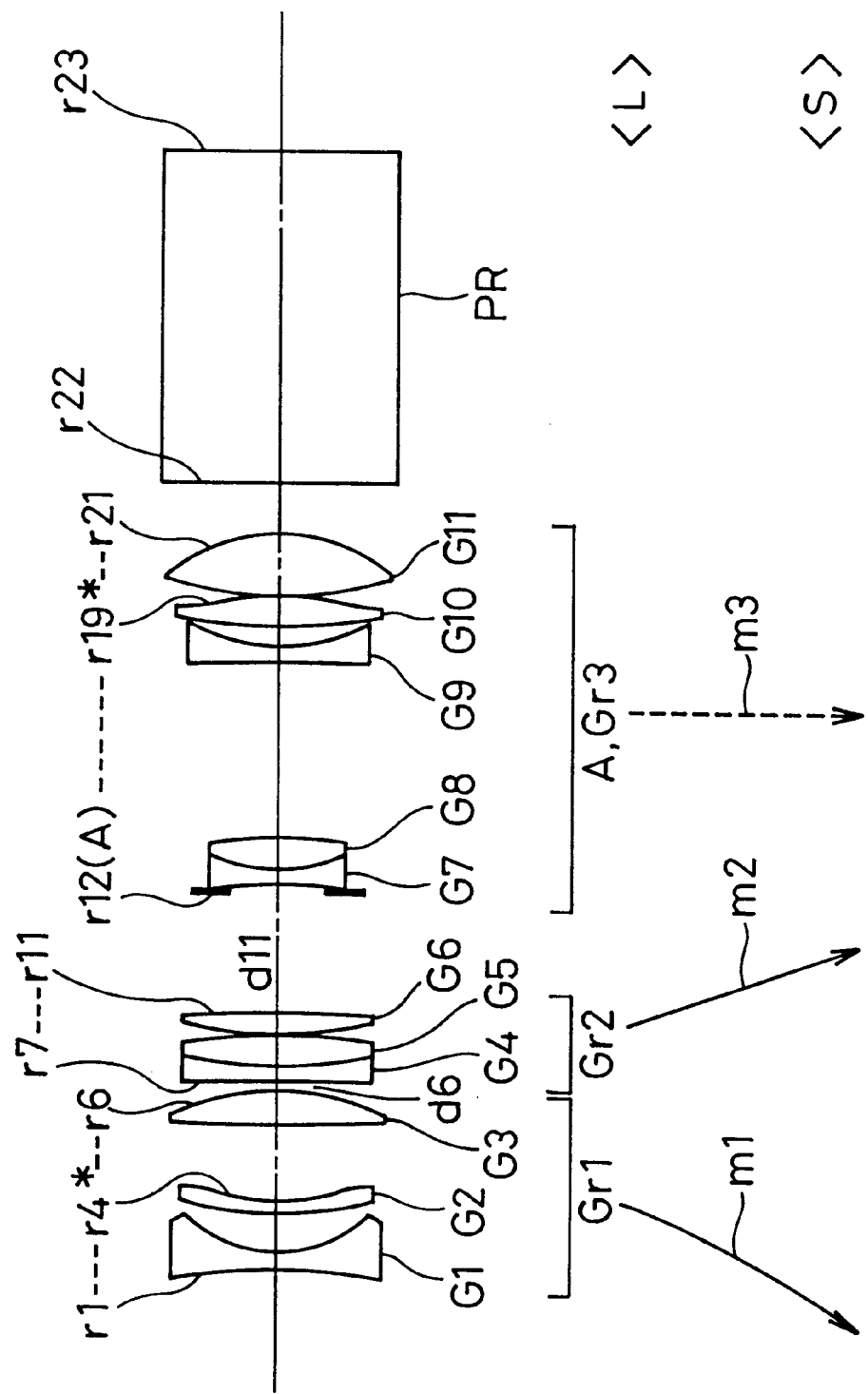
FIG. 15 shows the lens arrangement of a fourth embodiment.
Figure 19:
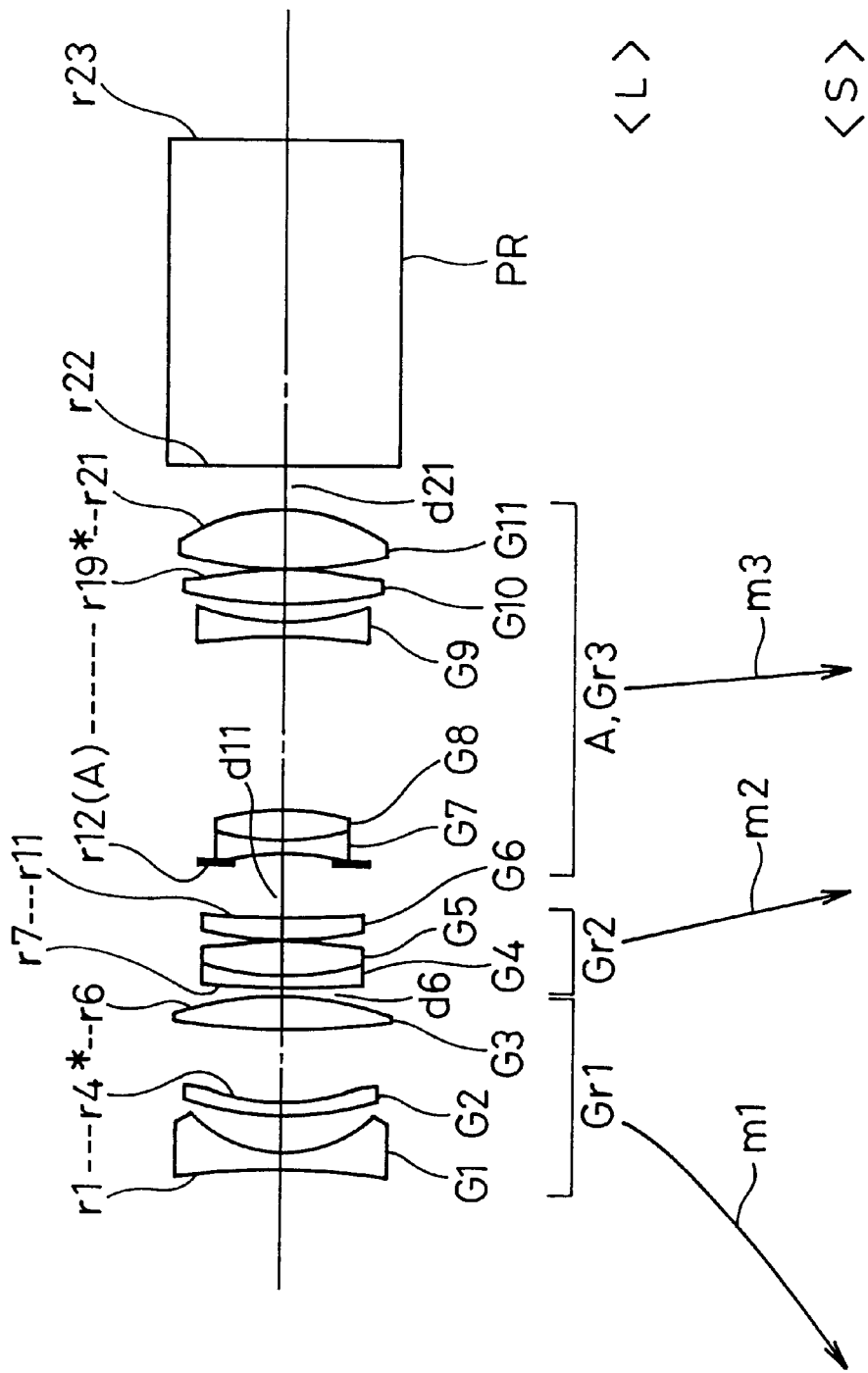
FIG. 19 shows the lens arrangement of a fifth embodiment.

FIG. 2 shows an aspherical surface "sa" adding a convergent optical power. The aspherical deviation $\Delta X$ is the distance from a paraxial spherical surface (reference spherical surface) "sr" to the aspherical surface "sa" in the direction of the optical axis AX, and is positive to the directions of the arrows that increase the convergent optical power of the surface ($\Delta X > 0$). The condition (1) defines the aspherical deviation $\Delta X1$ of the aspherical lens element in the first lens unit Gr1. The lower limit of the condition (1) indicates that the aspherical lens element is a convergent aspherical lens element ($\Delta X1 > 0$). When the upper limit of the condition (1) is exceeded, although distortion is advantageously corrected, the aspherical deviation is too great, so that it is difficult to maintain the processing accuracy at the time of production. The condition (2) defines the aspherical deviation $\Delta X3$ of the aspherical lens element in the third lens unit Gr3. The upper limit of the condition (2) indicates that the aspherical lens element is a divergent aspherical lens element. When the lower limit of the condition (2) is exceeded, it is difficult to maintain the processing accuracy at the time of production.

In a variable magnification optical system comprising three lens units of negative, positive, positive configuration from the projection side wherein the magnification is varied by moving at least the first lens unit Gr1 and the second lens unit Gr2 along the optical axis like in the above-described embodiments, at least one positive lens element in the third lens unit Gr3 is desirably made of a material fulfilling the following conditions (3) and (4):

$$0.015 < \Theta - (0.644 - 0.00168 \cdot vd) < 0.06 \quad (3)$$

$$65 < vd < 100 \quad (4)$$

where $\Theta = (ng-nF)/(nF-nC)$, $vd = (nd-1)/(nF-nC)$, ng represents the refractive index for g-line (435.84 nm);

nF represents the refractive index for F-line (486.13 nm);

nd represents the refractive index for d-line (587.56 nm); and nC represents the refractive index for C-line (656.28 nm).

The condition (3) quantitatively defines the anomalous partial dispersibility of the used lens material for g-line and F-line as the deviation from the standard line obtained by connecting normal glass. Specifically, $\Theta$ of the condition (3) represents the partial dispersion ratio of the used lens material between g-line and F-line, and the parenthesized portion represents the partial dispersion ratio obtained by a calculation in the case of normal glass (reference glass) of the same vd (Abbe number). That is, the lens material fulfilling the condition (3) is one generally called anomalous dispersion glass. That the deviation from the standard line (reference line) is greater than 0.015 indicates that the refractive index for g-line is relatively high compared to that of normal glass.

FIG. 1 schematically shows the lens arrangement of a variable magnification optical system of negative, positive, positive configuration in the shortest focal length condition <S>. In FIG. 1, the broken line represents the off-axial principal ray. In a conventional variable magnification projection optical system, when lateral chromatic aberrations for g-line and for d-line are corrected so as to be situated at the same position on the display device plane D, the position largely shifts toward the outside of the optical axis with respect to d-line. The hollow arrow on the display device plane D represents the lateral chromatic aberration for g-line together with the direction thereof.

The above-mentioned lateral chromatic aberration for g-line is corrected based on the following principle: When anomalous dispersion glass is used for a positive lens element in the third lens unit Gr3 having a positive optical power, an effect of bending g-line in the direction shown by the small arrow (a) in FIG. 1 increases in the third lens unit Gr3. This effect is produced because the refractive index of anomalous dispersion glass for g-line is relatively high compared to that of normal glass. For this reason, when lateral chromatic aberrations for g-line and for C-line are corrected by fulfilling the condition (3), the lateral chromatic aberration for g-line which shifts toward the outside of the optical axis in the shortest focal length condition <S> can be reduced far more than in conventional projection optical systems.

Therefore, when the lower limit of the condition (3) is exceeded, the anomalous dispersibility of the lens material used for the third lens unit Gr3 decreases, so that lateral chromatic aberration cannot be sufficiently reduced. When the upper limit of the condition (3) is exceeded, although the anomalous dispersibility is sufficient, such a lens material generally does not exist. Granted that such a material exists, the cost will largely increase. When the lower limit of the condition (4) is exceeded, the third lens unit Gr3 is not sufficiently achromatic, so that variation in lateral chromatic aberration and axial chromatic aberration due to magnification variation increases. When the upper limit of the condition (4) is exceeded, although the third lens unit Gr3 is sufficiently achromatic, such a lens material generally does not exist.

In a variable magnification optical system comprising three lens units of negative, positive, positive configuration from the projection side wherein the magnification is varied by moving at least the first lens unit Gr1 and the second lens unit Gr2 along the optical axis like in the above-described embodiments, at least one negative lens element in the first lens unit Gr1 is desirably made of a lens material fulfilling the following conditions (5) and (6):

$$0.015 < \Theta - (0.644 - 0.00168 \cdot vd) < 0.06 \quad (5)$$

$$65 < vd < 100 \quad (6)$$

where $\Theta = (ng - nF)/(nF - nC)$;

$vd = (nd - 1)/(nF - nC)$;

ng represents the refractive index for g-line (435.84 nm);

nF represents the refractive index for F-line (486.13 nm);

nd represents the refractive index for d-line (587.56 nm); and nC represents the refractive index for C-line (656.28 nm).

The conditions (5) and (6) define the lens material like the conditions (3) and (4). When anomalous dispersion glass is used for a negative lens element in the first lens unit Gr1 having a negative optical power, an effect of bending g-line in the direction shown by the small arrow (b) of FIG. 1 increases in the first lens unit Gr1. This effect is produced because the refractive index of anomalous dispersion glass for g-line is relatively high compared to that of normal glass. For this reason, when lateral chromatic aberrations for g-line and for C-line are corrected by fulfilling the condition (5), the lateral chromatic aberration for g-line which shifts toward the outside of the optical axis in the shortest focal length condition <S> can be further reduced.

Therefore, when the lower limit of the condition (5) is exceeded, the anomalous dispersibility of the lens material used for the first lens unit Gr1 decreases, so that lateral chromatic aberration cannot be sufficiently reduced. When the upper limit of the condition (5) is exceeded, although the anomalous dispersibility is sufficient, such a lens material generally does not exist. Granted that such a material exists, the cost will largely increase. When the lower limit of the condition (6) is exceeded, the first lens unit Gr1 is not sufficiently achromatic, so that variation in lateral chromatic aberration and axial chromatic aberration due to magnification variation increases. When the upper limit of the condition (6) is exceeded, although the first lens unit Gr1 is sufficiently achromatic, such a lens material generally does not exist.

In a variable magnification optical system comprising three lens units of negative, positive, positive configuration from the projection side wherein the magnification is varied by moving at least the first lens unit Gr1 and the second lens unit Gr2 along the optical axis like in the above-described embodiments, it is desirable to further fulfill at least one of the following conditions (7) and (8):

$$0.7 < |\phi 1/\phi 2| < 1.2 \quad (7)$$

$$0.2 < \phi 2 \cdot fW < 0.7 \quad (8)$$

where $\phi 1$ represents the optical power of the first lens unit Gr1;

$\phi 2$ represents the optical power of the second lens unit Gr2; and fW represents the focal length of the entire optical system in the shortest focal length condition <S>.

The condition (7) defines the balance between the optical powers of the first lens unit Gr1 and the second lens unit Gr2. When the lower limit of the condition (7) is exceeded, the optical power of the first lens unit Gr1 is relatively weak, so that the first lens unit Gr1 largely moves toward the enlargement side in the shortest focal length condition. Consequently, the overall length increases and since the off-axial rays passes a high position of the lens, the lens diameter of the first lens unit Gr1 increases. When the upper limit of the condition (7) is exceeded, the optical power of the first lens unit Gr1 is relatively strong, so that although the movement amount of the first lens unit Gr1 for magnification variation decreases, spherical aberration and coma are largely generated. As a result, aberration correction is difficult.

The condition (8) defines the appropriate range of the optical power of the second lens unit Gr2. When the optical power of the second lens unit Gr2 exceeds the lower limit of the condition (8) to decrease, the movement amount of the second lens unit Gr2 for magnification variation increases, so that the overall size of the optical system increases. When the optical power of the second lens unit Gr2 exceeds the upper limit of the condition (8) to increase, the aberrations generated in the second lens unit Gr2 increase, so that variation in spherical aberration and astigmatism due to magnification variation increases. As a result, aberration correction is difficult.

In a variable magnification optical system comprising three lens units of negative, positive, positive configuration from the projection side wherein the magnification is varied by moving at least the first lens unit Gr1 and the second lens unit Gr2 along the optical axis and at least one aspherical lens element is provided in each of the first lens unit Gr1 and the third lens unit Gr3 like in the above-described embodiments, at least one aspherical lens element in the first lens unit Gr1 and at least one aspherical lens element in the third lens unit Gr3 are desirably made of synthetic resin and desirably fulfill at least one of the following conditions (9) and (10):

$$0.005 < |\phi 1 asp \cdot fw| < 0.2 \quad (9)$$

$$0.05 < |\phi 3 asp \cdot fW| < 0.4 \quad (10)$$

where $\phi 1 asp$ represents the optical power of the aspherical lens element in the first lens unit Gr1;

$\phi 3 asp$ represents the optical power of the aspherical lens element in the third lens unit Gr3; and fW represents the focal length of the entire optical system in the shortest focal length condition <S>.

By using injection-molded lenses made of synthetic resin such as acrylic plastic or polycarbonate as at least one aspherical lens element in the first lens unit Gr1 and at least one aspherical lens element in the third lens unit Gr3, the aspherical lens elements have a lens configuration with a high degree of freedom. Consequently, a high-resolution, high-performance variable magnification optical system comprising a small number of lens elements can be achieved, and productivity improvement, price reduction and weight reduction can be achieved. Since aspherical lenses are largely degraded in performance due to production errors and decentering and synthetic resin lenses more largely vary in configuration and refractive index due to temperature variation and humidity variation than glass lenses, it is desirable to form an aspherical lens having as weak an optical power as possible of synthetic resin.

The condition (9) defines the optical power of at least one aspherical lens element in the first lens unit Gr1. The condition (10) defines the optical power of at least one aspherical lens element in the third lens unit Gr3. When the optical powers of the aspherical lens elements exceed the upper limits of the conditions (9) and (10) to increase, performance degradation due to production errors and decentering and performance variation due to temperature variation and humidity variation increase. When the optical powers of the aspherical lens elements exceed the lower limits of the conditions (9) and (10) to decrease, the aspherical lens elements are no longer influential in aberration correction, so that excellent performance cannot be obtained.

In a variable magnification optical system comprising three lens units of negative, positive, positive configuration from the projection side wherein the magnification is varied by moving at least the first lens unit Gr1 and the second lens unit Gr2 along the optical axis like in the above-described embodiments, the diaphragm (A) is desirably disposed substantially at the front side focal point of the third lens unit Gr3. By disposing the diaphragm (A) substantially at the front side focal point of the third lens unit Gr3, an optical system telecentric to the reduction side (i.e., the display device side) can be formed. When the optical system is telecentric to the reduction side, the ray passing through the cross-dichroic prism (PR) disposed on the display device side is incident on the dichroic plane always at the same angle irrespective of the height on the display device plane D. Consequently, color unevenness can be prevented from being caused on the images projected onto the screen.

In the case where the third lens unit Gr3 is fixed when the magnification is varied like in the first to fourth embodiments, the F-number on the reduction side does not vary due to magnification variation. Here, the "diaphragm" includes not only a variable aperture where the axial beam diameter is variable but also a beam restricting plate, for example of the type that serves also as a lens stopper, for restricting the axial beam with a fixed beam diameter.

While the lens elements of the lens units of the above-described embodiments are all refractive lenses that deflect incident rays through refraction, the present invention is not limited thereto. For example, the lens elements may be diffractive lenses that deflect incident rays through diffraction or refraction-diffraction hybrid lenses that deflect incident rays through a combination of diffraction and refraction.

The construction of the variable magnification optical system embodying the present invention will be more concretely described with reference to construction data and graphic representations of aberrations. Tables 1 to 5 show the construction data of the first to fifth embodiments, respectively.

In the tables, ri (i=1, 2, 3, . . . ) represents the radius of curvature of the i-th surface counted from the enlargement side (i.e., the projection side), di (i=1, 2, 3, . . . ) represents the i-th axial distance counted from the enlargement side, Ni (i=1, 2, 3, . . . ) and vi (i=1, 2, 3, . . . ) represent the refractive index (nd) and the Abbe number (vd), for d-line, of the i-th optical element counted from the enlargement side. The axial distances varied during zooming operation (variable distances) are axial distances between the lens units in the longest focal length condition (telephoto condition) <L>, in the middle focal length condition <M> and in the shortest focal length condition (wide-angle condition) <S>. The focal lengths f and the F-numbers FNO corresponding to the focal length conditions <L>, <M> and <S> are also shown.

The surfaces marked with ri followed by asterisks are aspherical and defined by the expression (AS) shown below representing the configuration of an aspherical surface. Aspherical data are also shown. Table 6 shows the refractive indices of the lens elements associated with the conditions (3) to (6). Table 7 shows condition corresponding values, etc. in the embodiments.

$$X = \frac{C \cdot Y^2}{1 + (1 - \varepsilon \cdot Y^2 \cdot C^2)^{\frac{1}{2}}} + \sum_i (Ai \cdot Y^i) \quad (AS)$$

In the expression (AS),

X represents the amount of displacement from a reference surface in the direction of the optical axis;

Y is the height in the direction perpendicular to the optical axis;

C is the paraxial curvature;

$\varepsilon$ is the quadric surface parameter; and

Ai is the i-th aspherical coefficient.

FIGS. 4A to 4D through 6A to 6D, 8A to 8D through 10A to 10D, 12A to 12D through 14A to 14D, 16A to 16D through 18A to 18D, and 20A to 20D through 22A to 22D are graphic representations of aberrations, for an infinite object on the reduction side, of the first to fifth embodiments (optical systems including the cross-dichroic prism (PR)). FIGS. 4A, 5A, 6A, 8A, 9A, 10A, 12A, 13A, 14A, 16A, 17A, 18A, 20A, 21A and 22A show spherical aberration and sine condition. FIGS. 4B, 5B, 6B, 8B, 9B, 10B, 12B, 13B, 14B, 16B, 17B, 18B, 20B, 21B and 22B show astigmatism. FIGS. 4C, 5C, 6C, 8C, 9C, 10C, 12C, 13C, 14C, 16C, 17C, 18C, 20C, 21C and 22C show distortion. FIGS. 4D, 5D, 6D, 8D, 9D, 10D, 12D, 13D, 14D, 16D, 17D, 18D, 20D, 21D and 22D show lateral chromatic aberration. Y' represents the image height. FIGS. 4A to 4D, 8A to 8D, 12A to 12D, 16A to 16D and 20A to 20D show the aberrations in the longest focal length condition <L>. FIGS. 5A to 5D, 9A to 9D, 13A to 13D, 17A to 17D and 21A to 21D show the aberrations in the middle focal length condition <M>. FIGS. 6A to 6D, 10A to 10D, 14A to 14D, 18A to 18D and 22A to 22D show the aberrations in the shortest focal length condition <S>. The solid line (d) represents spherical aberration for d-line. The dash and dotted line (g) represents spherical aberration for g-line. The chain double-dashed line (C) represents spherical aberration for C-line. The broken line (SC) represents sine condition. The broken line (DM) represents astigmatism for d-line on the meridional image plane. The solid line (DS) represents astigmatism for d-line on the sagittal image plane. The solid line of distortion % represents distortion for d-line. The solid line (g) represents lateral chromatic aberration for g-line. The broken line (C) represents lateral chromatic aberration for C-line.

When the above-described embodiments are used in projectors (e.g. liquid crystal projectors) as variable magnification projection optical systems, although, originally, the screen plane is the image plane and the display device plane (e.g. liquid crystal panel plane) D is the object plane, in the above-described embodiments, the optical systems are designed as reduction optical systems (e.g. imaging optical systems) and the screen plane is regarded as the object plane to evaluate the optical performance on the display device plane D.

Obviously, many modifications and variations of the present invention are possible in light of the above teachings. It is therefore to be understood that within the scope of the appended claims, the invention may be practiced other than as specifically described.

TABLE 1

<1st Embodiment>
f = 50.0~42.0~34.0
FNO = 3.00~3.00~3.00

| Radius of Curvature | Axial Distance | Refractive Index | Abbe Number | |
|---|---|---|---|---|
| {1st lens unit (Gr1)} | | | | |
| r1 = 318.607 | | | | |
| | d1 = 3.300 | N1 = 1.49700 | ν1 = 81.61 | ···G1 |
| r2 = 23.806 | | | | |
| | d2 = 7.300 | | | |
| r3* = 46.016 | | | | |
| | d3 = 4.800 | N2 = 1.49300 | ν2 = 58.34 | ···G2 |
| r4 = 52.509 | | | | |
| | d4 = 23.600 | | | |
| r5 = −25.607 | | | | |
| | d5 = 7.300 | N3 = 1.62041 | ν3 = 60.29 | ···G3 |
| r6 = −27.257 | | | | |
| | d6 = 2.000~16.249~37.203 | | | |
| {2nd lens unit (Gr2)} | | | | |
| r7 = −364.469 | | | | |
| | d7 = 3.000 | N4 = 1.80518 | ν4 = 25.43 | ···G4 |
| r8 = 79.250 | | | | |
| | d8 = 8.800 | N5 = 1.67000 | ν5 = 57.07 | ···G5 |
| r9 = −79.250 | | | | |
| | d9 = 0.250 | | | |
| r10 = 65.499 | | | | |
| | d10 = 6.200 | N6 = 1.67000 | ν6 = 57.07 | ···G6 |
| r11 = −818.003 | | | | |
| | d11 = 19.217~10.859~2.500 | | | |
| {3rd lens unit (Gr3)} | | | | |
| r12 = ∞(Diaphragm A) | | | | |
| | d12 = 1.800 | | | |
| r13 = −157.604 | | | | |
| | d13 = 2.700 | N7 = 1.75450 | ν7 = 51.57 | ···G7 |
| r14 = 61.878 | | | | |
| | d14 = 5.500 | N8 = 1.80518 | ν8 = 25.43 | ···G8 |
| r15 = 574.386 | | | | |
| | d15 = 50.000 | | | |
| r16 = 333.262 | | | | |
| | d16 = 3.000 | N9 = 1.84666 | ν9 = 23.82 | ···G9 |
| r17 = 50.750 | | | | |
| | d17 = 4.500 | | | |
| r18 = 103.719 | | | | |
| | d18 = 7.500 | N10 = 1.49300 | ν10 = 58.34 | ···G10 |
| r19* = −155.682 | | | | |
| | d19 = 0.300 | | | |
| r20 = 66.646 | | | | |
| | d20 = 12.000 | N11 = 1.49700 | ν11 = 81.61 | ···G11 |
| r21 = −55.102 | | | | |
| | d21 = 27.929 | | | |
| {Cross-dichroic prism(PR)} | | | | |
| r22 = ∞ | | | | |
| | d22 = 35.500 | N12 = 1.51680 | ν12 = 64.20 | |
| r23 = ∞ | | | | |

[Aspherical data of 3rd surface (r3)]
$\epsilon = 2.0000$
$A4 = 0.30729 \times 10^{-5}$
$A6 = 0.15310 \times 10^{-8}$
$A8 = 0.26608 \times 10^{-11}$
$A10 = 0.70583 \times 10^{-14}$

[Aspherical data of 19th surface (r19)]
$\epsilon = 1.0000$
$A4 = 0.15894 \times 10^{-5}$
$A6 = 0.48852 \times 10^{-9}$
$A8 = -0.39042 \times 10^{-12}$
$A10 = 0.84250 \times 10^{-15}$

TABLE 2

<2nd Embodiment>
f = 50.0~42.0~34.0
FNO = 3.00~3.00~3.00

| Radius of Curvature | Axial Distance | Refractive Index | Abbe Number | |
|---|---|---|---|---|
| {1st lens unit (Gr1)} | | | | |
| r1 = 106.908 | | | | |
| | d1 = 3.300 | N1 = 1.49700 | ν1 = 81.61 | ···G1 |
| r2 = 24.944 | | | | |
| | d2 = 7.300 | | | |
| r3* = 41.729 | | | | |
| | d3 = 4.800 | N2 = 1.49300 | ν2 = 58.34 | ···G2 |
| r4 = 38.766 | | | | |
| | d4 = 23.600 | | | |
| r5 = −25.291 | | | | |
| | d5 = 7.300 | N3 = 1.62041 | ν3 = 60.29 | ···G3 |
| r6 = −27.691 | | | | |
| | d6 = 2.000~16.909~38.834 | | | |
| {2nd lens unit (Gr2)} | | | | |
| r7 = −256.692 | | | | |
| | d7 = 3.000 | N4 = 1.80518 | ν4 = 25.43 | ···G4 |
| r8 = 72.634 | | | | |
| | d8 = 8.800 | N5 = 1.67790 | ν5 = 55.38 | ···G5 |
| r9 = −72.634 | | | | |
| | d9 = 0.250 | | | |
| r10 = 54.148 | | | | |
| | d10 = 6.200 | N6 = 1.67790 | ν6 = 55.38 | ···G6 |
| r11 = −1697.908 | | | | |
| | d11 = 15.118~8.809~2.500 | | | |
| {3rd lens unit (Gr3)} | | | | |
| r12 = ∞(Diaphragm A) | | | | |
| | d12 = 1.800 | | | |
| r13 = −130.819 | | | | |
| | d13 = 2.700 | N7 = 1.75450 | ν7 = 51.57 | ···G7 |
| r14 = 38.150 | | | | |
| | d14 = 5.500 | N8 = 1.83350 | ν8 = 21.00 | ···G8 |
| r15 = 90.019 | | | | |
| | d15 = 52.000 | | | |
| r16 = 10234.368 | | | | |
| | d16 = 3.000 | N9 = 1.84666 | ν9 = 23.82 | ···G9 |
| r17 = 66.033 | | | | |
| | d17 = 2.800 | | | |
| r18 = 81.606 | | | | |
| | d18 = 7.500 | N10 = 1.49300 | ν10 = 58.34 | ···G10 |
| r19* = −120.968 | | | | |
| | d19 = 0.300 | | | |
| r20 = 76.088 | | | | |
| | d20 = 12.000 | N11 = 1.49700 | ν11 = 81.61 | ···G11 |
| r21 = −56.820 | | | | |
| | d21 = 48.042 | | | |
| {Cross-dichroic prism(PR)} | | | | |
| r22 = ∞ | | | | |
| | d22 = 35.500 | N12 = 1.51680 | ν12 = 64.20 | |
| r23 = ∞ | | | | |

[Aspherical data of 3rd surface (r3)]
$\epsilon = 2.0000$
$A4 = 0.24785 \times 10^{-5}$
$A6 = 0.16525 \times 10^{-8}$
$A8 = 0.23102 \times 10^{-11}$
$A10 = 0.26012 \times 10^{-14}$

[Aspherical data of 19th surface (r19)]
$\epsilon = 1.0000$
$A4 = 0.14686 \times 10^{-5}$
$A6 = 0.13387 \times 10^{-8}$
$A8 = -0.11972 \times 10^{-11}$
$A10 = 0.13612 \times 10^{-14}$

TABLE 3

<3rd Embodiment>
f = 50.0~42.0~34.0
FNO = 3.00~3.00~3.00

| Radius of Curvature | Axial Distance | Refractive Index | Abbe Number | |
|---|---|---|---|---|
| {1st lens unit (Gr1)} | | | | |
| r1 = 1015.311 | | | | |
| | d1 = 3.300 | N1 = 1.49700 | ν1 = 81.61 | ···G1 |
| r2 = 26.219 | | | | |
| | d2 = 7.300 | | | |
| r3* = 52.039 | | | | |

TABLE 3-continued

|  |  |  |  |  |
|---|---|---|---|---|
| r4 = 58.172 | d3 = 4.800 | N2 = 1.49300 | ν2 = 58.34 | ···G2 |
| r5 = −25.661 | d4 = 23.600 |  |  |  |
| r6 = −28.598 | d5 = 7.300 | N3 = 1.62041 | ν3 = 60.29 | ···G3 |
|  | d6 = 2.000~12.189~27.172 |  |  |  |

{2nd lens unit (Gr2)}

|  |  |  |  |  |
|---|---|---|---|---|
| r7 = −394.784 | d7 = 3.000 | N4 = 1.80518 | ν4 = 25.43 | ···G4 |
| r8 = 92.939 | d8 = 8.800 | N5 = 1.67000 | ν5 = 57.07 | ···G5 |
| r9 = −92.939 | d9 = 0.250 |  |  |  |
| r10 = 84.685 | d10 = 6.200 | N6 = 1.67000 | ν6 = 57.07 | ···G6 |
| r11 = −318.235 | d11 = 33.022~17.761~2.500 |  |  |  |

{3rd lens unit (Gr3)}

|  |  |  |  |  |
|---|---|---|---|---|
| r12 = ∞(Diaphragm A) | d12 = 1.800 |  |  |  |
| r13 = −103.621 | d13 = 2.700 | N7 = 1.75450 | ν7 = 51.57 | ···G7 |
| r14 = 99.080 | d14 = 5.500 | N8 = 1.80518 | ν8 = 25.43 | ···G8 |
| r15 = −228.118 | d15 = 50.000 |  |  |  |
| r16 = 496.828 | d16 = 3.000 | N9 = 1.84666 | ν9 = 23.82 | ···G9 |
| r17 = 53.346 | d17 = 4.500 |  |  |  |
| r18 = 97.515 | d18 = 5.500 | N10 = 1.49300 | ν10 = 58.34 | ···G10 |
| r19* = −217.100 | d19 = 0.300 |  |  |  |
| r20 = 72.872 | d20 = 15.000 | N11 = 1.49700 | ν11 = 81.61 | ···G11 |
| r21 = −47.509 | d21 = 35.529 |  |  |  |

{Cross-dichroic prism(PR)}

|  |  |  |  |  |
|---|---|---|---|---|
| r22 = ∞ | d22 = 35.500 | N12 = 1.51680 | ν12 = 64.20 |  |
| r23 = ∞ |  |  |  |  |

[Aspherical data of 3rd surface (r3)]
$\epsilon$ = 2.0000
A4 = 0.40645 × 10$^{-5}$
A6 = −0.84472 × 10$^{-9}$
A8 = 0.11082 × 10$^{-10}$
A10 = −0.66870 × 10$^{-14}$

[Aspherical data of 19th surface (r19)]
$\epsilon$ = 1.0000
A4 = 0.22520 × 10$^{-5}$
A6 = 0.45221 × 10$^{-9}$
A8 = −0.16144 × 10$^{-12}$
A10 = 0.90748 × 10$^{-15}$

TABLE 4

<4th Embodiment>
f = 37.2~31.0~25.4
FNO = 3.00~3.00~3.00

| Radius of Curvature | Axial Distance | Refractive Index | Abbe Number |  |
|---|---|---|---|---|

{1st lens unit (Gr1)}

|  |  |  |  |  |
|---|---|---|---|---|
| r1 = −122.391 | d1 = 4.000 | N1 = 1.62041 | ν1 = 60.29 | ···G1 |
| r2 = 28.587 | d2 = 8.000 |  |  |  |
| r3 = 79.819 | d3 = 3.000 | N2 = 1.49300 | ν2 = 58.34 | ···G2 |
| r4* = 44.750 | d4 = 16.000 |  |  |  |
| r5 = 284.527 | d5 = 7.500 | N3 = 1.60311 | ν3 = 60.74 | ···G3 |
| r6 = −59.730 | d6 = 2.000~24.439~54.122 |  |  |  |

TABLE 4-continued

{2nd lens unit (Gr2)}

|  |  |  |  |  |
|---|---|---|---|---|
| r7 = −1012.258 | d7 = 3.200 | N4 = 1.80518 | ν4 = 25.46 | ···G4 |
| r8 = 102.609 | d8 = 7.000 | N5 = 1.71300 | ν5 = 53.93 | ···G5 |
| r9 = −148.786 | d9 = 0.300 |  |  |  |
| r10 = 100.070 | d10 = 4.500 | N6 = 1.69680 | ν6 = 56.47 | ···G6 |
| r11 = −805.309 | d11 = 26.366~14.089~3.000 |  |  |  |

{3rd lens unit (Gr3)}

|  |  |  |  |  |
|---|---|---|---|---|
| r12 = ∞(Diaphragm A) | d12 = 2.000 |  |  |  |
| r13 = −62.697 | d13 = 3.000 | N7 = 1.77250 | ν7 = 49.62 | ···G7 |
| r14 = 36.443 | d14 = 6.500 | N8 = 1.80741 | ν8 = 31.59 | ···G8 |
| r15 = −118.994 | d15 = 38.000 |  |  |  |
| r16 = −2257.387 | d16 = 3.500 | N9 = 1.84666 | ν9 = 23.82 | ···G9 |
| r17 = 46.047 | d17 = 3.800 |  |  |  |
| r18 = 93.180 | d18 = 7.500 | N10 = 1.49300 | ν10 = 58.34 | ···G10 |
| r19* = −78.917 | d19 = 0.300 |  |  |  |
| r20 = 76.222 | d20 = 14.000 | N11 = 1.49310 | ν11 = 83.58 | ···G11 |
| r21 = −38.531 | d21 = 11.396 |  |  |  |

{Cross-dichroic prism(PR)}

|  |  |  |  |  |
|---|---|---|---|---|
| r22 = ∞ | d22 = 73.000 | N12 = 1.51680 | ν12 = 64.20 |  |
| r23 = ∞ |  |  |  |  |

[Aspherical data of 4th surface (r4)]
$\epsilon$ = 1.0000
A4 = −0.96238 × 10$^{-5}$
A6 = −0.40048 × 10$^{-8}$
A8 = 0.74716 × 10$^{-11}$
A10 = −0.19054 × 10$^{-13}$

[Aspherical data of 19th surface (r19)]
$\epsilon$ = 1.0000
A4 = 0.23817 × 10$^{-5}$
A6 = 0.37614 × 10$^{-8}$
A8 = −0.56197 × 10$^{-11}$
A10 = 0.81501 × 10$^{-14}$

TABLE 5

<5th Embodiment>
f = 37.2~31.0~25.4
FNO = 3.00~3.006~3.00

| Radius of Curvature | Axial Distance | Refractive Index | Abbe Number |  |
|---|---|---|---|---|

{1st lens unit (Gr1)}

|  |  |  |  |  |
|---|---|---|---|---|
| r1 = −166.591 | d1 = 4.000 | N1 = 1.62041 | ν1 = 60.29 | ···G1 |
| r2 = 28.156 | d2 = 8.000 |  |  |  |
| r3 = 76.966 | d3 = 3.000 | N2 = 1.49300 | ν2 = 58.34 | ···G2 |
| r4* = 44.632 | d4 = 16.000 |  |  |  |
| r5 = 161.635 | d5 = 7.500 | N3 = 1.60311 | ν3 = 60.74 | ···G3 |
| r6 = −73.690 | d6 = 2.000~35.947~80.115 |  |  |  |

{2nd lens unit (Gr2)}

|  |  |  |  |  |
|---|---|---|---|---|
| r7 = 366.056 | d7 = 3.200 | N4 = 1.80518 | ν4 = 25.46 | ···G4 |
| r8 = 75.337 | d8 = 7.000 | N5 = 1.71300 | ν5 = 53.93 | ···G5 |
| r9 = −102.345 | d9 = 0.300 |  |  |  |

TABLE 5-continued r10 = 110.516
   d10 = 4.500 N6 = 1.69680 ν6 = 56.47 ···G6
r11 = 211.819
   d11 = 12.469~7.251~3.000
{3rd lens unit (Gr3)}
r12 = ∞(Diaphragm A)
   d12 = 2.000
r13 = −54.292
   d13 = 3.000 N7 = 1.77250 ν7 = 49.62 ···G7
r14 = 62.156
   d14 = 6.500 N8 = 1.80741 ν8 = 31.59 ···G8
r15 = −70.275
   d15 = 38.000
r16 = −178.280
   d16 = 3.500 N9 = 1.84666 ν9 = 23.82 ···G9
r17 = 58.354
   d17 = 3.800
r18 = 99.748
   d18 = 7.500 N10 = 1.49300 ν10 = 58.34 ···G10
r19* = −73.718
   d19 = 0.300
r20 = 96.260
   d20 = 14.000 N11 = 1.49310 ν11 = 83.58 ···G11
r21 = −37.998
   d21 = 9.619~6.749~4.289
{Cross-dichroic prism(PR)}
r22 = ∞
   d22 = 73.000 N12 = 1.51680 ν12 = 64.20
r23 = ∞
[Aspherical data of 4th surface (r4)]
ε = 1.0000
A4 = −0.84195 × $10^{-5}$
A6 = −0.41243 × $10^{-8}$
A8 = 0.44601 × $10^{-11}$
A10 = −0.16665 × $10^{-13}$
[Aspherical data of 19th surface (r19)]
ε = 1.0000
A4 = 0.36980 × $10^{-5}$
A6 = 0.37995 × $10^{-8}$
A8 = −0.47802 × $10^{-11}$
A10 = 0.75169 × $10^{-14}$

TABLE 6

(Refractive Index)

| Unit | Element | n g | n F | n d | n C |
|---|---|---|---|---|---|
| Emb. 1 | Gr1 | G1 | 1.50451 | 1.50123 | 1.49700 | 1.49514 |
| | Gr3 | G11 | | | | |
| Emb. 2 | Gr1 | G1 | | | | |
| | Gr3 | G11 | | | | |
| Emb. 3 | Gr1 | G1 | | | | |
| | Gr3 | G11 | | | | |
| Emb. 4 | Gr3 | G11 | 1.50037 | 1.49720 | 1.49310 | 1.49130 |
| Emb. 5 | Gr3 | G11 | | | | |

TABLE 7

<Condition Corresponding Values, etc.>

| | Condition | Emb. 1 | Emb. 2 | Emb. 3 | Emb. 4 | Emb. 5 |
|---|---|---|---|---|---|---|
| (1) | ΔX1/fW | 0.020 | 0.027 | 0.025 | 0.058 | 0.066 |
| (2) | ΔX3/fW | −0.010 | −0.015 | −0.017 | −0.021 | −0.026 |
| (3) | Θ − (0.644 − 0.00168 · νd) | | 0.032 | | 0.034 | |
| (4) | νd | | 81.61 | | 83.58 | |
| (5) | Θ − (0.644 − 0.00168 · νd) | | 0.032 | — | — | |
| (6) | νd | | 81.61 | — | — | |
| (7) | \|φ1/φ2\| | 0.91 | 0.78 | 1.14 | 0.91 | 0.91 |
| (8) | φ2 · fW | 0.54 | 0.61 | 0.48 | 0.28 | 0.28 |
| (9) | \|φ1asp · fW\| | 0.05 | 0.01 | 0.04 | 0.12 | 0.11 |

TABLE 7-continued

<Condition Corresponding Values, etc.>

| | Condition | Emb. 1 | Emb. 2 | Emb. 3 | Emb. 4 | Emb. 5 |
|---|---|---|---|---|---|---|
| (10) | \|φ3asp · fW\| | 0.27 | 0.33 | 0.24 | 0.29 | 0.29 |
| | Anomalous dispersion glass | | Gr1, Gr3 | | | Gr3 |
| | Movable units | | | Gr1, Gr2 | | Gr1~Gr3 |

What is claimed is:

1. A variable magnification optical system comprising, from a projection side:

a first lens unit having a negative optical power and including at least one lens element having an aspherical surface, the first lens unit moving along an optical axis direction during zooming operation;

a second lens unit having a positive optical power, the second lens unit moving along an optical axis direction during the zooming operation; and a third lens unit having a positive optical power, including at least one lens element having an aspherical surface and including a positive lens element, wherein the following conditions are fulfilled:

0 < ΔX1/fW < 0.08

−0.04 < ΔX3/fW < 0

0.015 < Θ3 − (0.644 − 0.00168·νd3) < 0.06

65 < νd3 < 100 where

ΔX1 represents an aspherical deviation of the lens element having an aspherical surface in the first lens unit;

ΔX3 represents an aspherical deviation of the lens element having an aspherical surface in the third lens unit;

fW represents a focal length of the optical system in its entirety in a shortest focal length condition;

Θ3 = (ng3 − nF3)/(nF3 − nC3)

ν3d = (nd3 − 1)/(nF3 − nC3)

ng3 represents a refractive index of the positive lens element in the third lens unit for g-line (435.84 nm);

nF3 represents a refractive index of the positive lens element in the third lens unit for F-line (486.13 nm);

nd3 represents a refractive index of the positive lens element in the third lens unit for d-line (587.56 nm); and nC3 represents a refractive index of the positive lens element in the third lens unit for C-line (656.28 nm).

2. A variable magnification optical system as claimed in claim 1, wherein the first lens unit has a negative lens element and wherein the following conditions are fulfilled:

0.015 < Θ1 − (0.644 − 0.00168·νd1) < 0.06

65 < νd1 < 100 where

Θ1 = (ng1 − nF1)/(nF1 − nC1)

νd1 = (nd1 − 1)/(nF1 − nC1)

ng1 represents a refractive index of the negative lens element in the first lens unit for g-line (435.84 nm);

nF1 represents a refractive index of the negative lens element in the first lens unit for F-line (486.13 nm);

nd1 represents a refractive index of the negative lens element in the first lens unit for d-line (587.56 nm); and nC1 represents a refractive index of the negative lens element in the first lens unit for C-line (656.28 nm).

3. A variable magnification optical system as claimed in claim 1, wherein the following condition is fulfilled:

$$0.7 < |\phi1/\phi2| < 1.2$$

where $\phi1$ represents an optical power of the first lens unit; and $\phi2$ represents an optical power of the second lens unit.

4. A variable magnification optical system as claimed in claim 1, wherein the following condition is fulfilled:

$$0.2 < \phi2 \cdot fW < 0.7$$

where $\phi2$ represents an optical power of the second lens unit; and fW represents a focal length of the optical system in its entirety in the shortest focal length condition.

5. A variable magnification optical system as claimed in claim 1, wherein the following condition is fulfilled:

$$0.005 < |\phi1asp \cdot fW| < 0.2$$

where $\phi1asp$ represents an optical power of the lens element having an aspherical surface in the first lens unit; and fW represents a focal length of the optical system in its entirety in the shortest focal length condition.

6. A variable magnification optical system as claimed in claim 1, wherein the following condition is fulfilled:

$$0.05 < |\phi3asp \cdot fW| 0.4$$

where $\phi3asp$ represents an optical power of the lens element having an aspherical surface in the third lens unit; and fW represents a focal length of the optical system in its entirety in the shortest focal length condition.

7. A variable magnification optical system as claimed in claim 1, wherein a diaphragm is provided at a front side focal point of the third lens unit.

8. A variable magnification optical system as claimed in claim 1, wherein the lens element having an aspherical surface in the first lens unit is made of resin.

9. A variable magnification optical system as claimed in claim 1, wherein the lens element having an aspherical surface in the third lens unit is made of resin.

10. A variable magnification optical system as claimed in claim 1, wherein the third lens unit is fixed during the zooming operation.

11. A variable magnification optical system comprising, from a projection side:

a first lens unit having a negative optical power and including at least one lens element having an aspherical surface, the first lens unit moving along an optical axis direction during the zooming operation;

a second lens unit having a positive optical power, the second lens unit moving along an optical axis direction during zooming operation;

a third lens unit having a positive optical power, including at least one lens element having an aspherical surface and including a positive lens element; and a cross-dichroic prism, wherein the following conditions are fulfilled:

$$0 < \Delta X1/fw < 0.08$$

$$-0.04 < \Delta X3/fW < 0$$

$$0.015 < \Theta3 - (0.644 - 0.00168 \cdot vd3) < 0.06$$

$$65 < vd3 < 100$$

where $\Delta X1$ represents an spherical deviation of the lens element having an aspherical surface in the first lens unit;

$\Delta X3$ represents an spherical deviation of the lens element having an aspherical surface in the third lens unit;

fW represents a focal length of the entire optical system in its entirety in a shortest focal length condition;

$$\Theta3 = (ng3 - nF3)/(nF3 - nC3)$$

$$vd3 = (nd3 - 1)/(nF3 - nC3)$$

ng3 represents a refractive index of the positive lens element in the third lens unit for g-line (435.84 nm);

nF3 represents a refractive index of the positive lens element in the third lens unit for F-line (486.13 nm);

nd3 represents a refractive index of the positive lens element in the third lens unit for d-line (587.56 nm); and nC3 represents a refractive index of the positive lens element in the third lens unit for C-line (656.28 nm).

12. A variable magnification optical system as claimed in claim 11, wherein the first lens unit has a negative lens element and wherein the following conditions are fulfilled:

$$0.015 < \Theta1 - (0.644 - 0.00168 \cdot vd1) < 0.06$$

$$65 < vd1 < 100$$

where $$\Theta1 = (ng1 - nF1)/(nF1 - nC1)$$

$$v1d = (nd1 - 1)/(nF1 - nC1)$$

ng1 represents a refractive index of the negative lens element in the first lens unit for g-line (435.84 nm);

nF1 represents a refractive index of the negative lens element in the first lens unit for F-line (486.13 nm);

nd1 represents a refractive index of the negative lens element in the first lens unit for d-line (587.56 nm); and nC1 represents a refractive index of the negative lens element in the first lens unit for C-line (656.28 nm).

* * * * *

UNITED STATES PATENT AND TRADEMARK OFFICE
CERTIFICATE OF CORRECTION

PATENT NO.   : 6,014,267
DATED        : January 11, 2000
INVENTOR(S)  : Katsutoshi Tsurutani and Katsuhiro Takamoto It is certified that error appears in the above-identified patent and that said Letters Patent is hereby corrected as shown below:

Column 2,
Line 33 (fourth formula), delete "65<vvd3<100", and insert -- 65<vd3<100 --.
Line 42 (fifth formula), delete "n3g" and insert -- ng3 --.

Claim 1, column 16,
Line 18, before "zooming", insert -- a --.
Line 45 (sixth formula), delete "v3d", and insert -- vd3 --.

Claim 6, column 17,
Line 39 (formula), delete "0.05<|φ3asp·fW|0.4", and insert -- 0.05<|φ3asp·fW|<0.4 --.

Claim 11, column 17,
Line 64, delete "the", and insert -- a --.
Line 67, before "zooming", insert -- the --.

Claim 11, column 18,
Line 6 (first formula), delete "0<ΔX1/fw<0.08", and insert -- 0<ΔX1/fW<0.08 --.
Line 18, delete "spherical", and insert -- aspherical --.
Line 20, delete "spherical", and insert -- aspherical --.
Line 22, delete "entire".

Signed and Sealed this

Eleventh Day of September, 2001

*Attest:*

NICHOLAS P. GODICI
*Attesting Officer*     Acting Director of the United States Patent and Trademark Office